US012795095B2

(12) United States Patent
Yang et al.

(10) Patent No.: US 12,795,095 B2
(45) Date of Patent: Nov. 10, 2026

(54) DEVICE AND METHOD FOR DECODING VIDEO DATA

(71) Applicant: SHARP KABUSHIKI KAISHA, Sakai City (JP)

(72) Inventors: Yu-Chiao Yang, Taipei (TW); Chih-Yu Teng, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/306,292

(22) Filed: Aug. 21, 2025

(65) Prior Publication Data

US 2025/0373790 A1 Dec. 4, 2025

Related U.S. Application Data

(63) Continuation of application No. 18/210,839, filed on Jun. 16, 2023, now Pat. No. 12,418,649.
(Continued)

(51) Int. Cl.
*H04N 19/119* (2014.01)
*H04N 19/103* (2014.01)
(Continued)

(52) U.S. Cl.
CPC ......... *H04N 19/119* (2014.11); *H04N 19/103* (2014.11); *H04N 19/105* (2014.11);
(Continued)

(58) Field of Classification Search
CPC ........................... H04N 19/119; H04N 19/103
(Continued)

(56) References Cited

U.S. PATENT DOCUMENTS

2006/0285764 A1 12/2006 Xu et al.
2010/0118959 A1 5/2010 Lou et al.
(Continued)

FOREIGN PATENT DOCUMENTS

CN 114026871 A 2/2022

OTHER PUBLICATIONS

Yoshitaka Kidani et al, "Non-EE2 Adaptive width for GPM blending area", JVET-Z0059, Joint Video Experts Team (JVET) of ITU-T SG 16 WP 3 and ISO/IEC JTC 1/SC 29, 26th Meeting, by teleconference, Apr. 20-29, 2022.
(Continued)

*Primary Examiner* — Amir Shahnami
(74) *Attorney, Agent, or Firm* — ScienBiziP, P.C.

(57) ABSTRACT

A method of decoding video data by an electronic device is provided. The electronic device receives the video data and determines a block unit from a current frame included in the video data. The electronic device determines, from multiple candidate lines, a partitioning line for dividing the block unit into a pair of geometric partitions using a geometric partitioning mode and, from multiple candidate modes, two different prediction modes of the block unit to generate two predicted blocks for the pair of the geometric partitions. The electronic device determines a blending width of the partitioning line from multiple candidate widths based on a block size of the block unit and weightedly combining the two predicted blocks along the partitioning line based on the blending width to reconstruct the block unit.

18 Claims, 9 Drawing Sheets

Related U.S. Application Data

(60) Provisional application No. 63/356,345, filed on Jun. 28, 2022, provisional application No. 63/353,227, filed on Jun. 17, 2022.

(51) Int. Cl.
*H04N 19/105* (2014.01)
*H04N 19/159* (2014.01)
*H04N 19/176* (2014.01)
*H04N 19/196* (2014.01)
*H04N 19/593* (2014.01)

(52) U.S. Cl.
CPC ......... *H04N 19/159* (2014.11); *H04N 19/176* (2014.11); *H04N 19/196* (2014.11); *H04N 19/593* (2014.11)

(58) Field of Classification Search
USPC ..................................................... 375/240.12
See application file for complete search history.

(56) References Cited

U.S. PATENT DOCUMENTS

| | | | | |
|---|---|---|---|---|
| 2012/0082224 | A1 | 4/2012 | Van Der Auwera et al. | |
| 2018/0184083 | A1 | 6/2018 | Panusopone et al. | |
| 2018/0262763 | A1 | 9/2018 | Seregin et al. | |
| 2019/0387251 | A1 | 12/2019 | Lin et al. | |
| 2021/0092392 | A1 | 3/2021 | Reuze et al. | |
| 2022/0264136 | A1 * | 8/2022 | Chen .................... | H04N 19/103 |
| 2022/0329800 | A1 | 10/2022 | Ray et al. | |
| 2022/0394269 | A1 | 12/2022 | Cao et al. | |
| 2023/0345023 | A1 * | 10/2023 | Chen .................... | H04N 19/132 |
| 2023/0396762 | A1 | 12/2023 | Gao et al. | |

OTHER PUBLICATIONS

Telecommunication Standardization Sector of ITU, "Versatile video coding", Recommendation ITU-T H.266, (Apr. 2022).

Output document of JVET, "Algorithm description of Enhanced Compression Model 5 (ECM 5)", JVET-Z2025-v1, Joint Video Experts Team (JVET) of ITU-T SG 16 WP 3 and ISO/IEC JTC 1/SC 29, 26th Meeting, by teleconference, Apr. 20-29, 2022.

Output document of JVET, "Algorithm description for Versatile Video Coding and Test Model 16 (VTM16)", JVET-Y2002-v1, Joint Video Experts Team (JVET) of ITU-T SG 16 WP 3 and 1S0/IEC JTC 1/SC 29, 25th Meeting, by teleconference, Jan. 12-21, 2022.

Input document to JVET, "AHG12: Convolutional cross-component model (CCCM) for intra prediction", JVET-Z0064-v1, Joint Video Experts Team (JVET) of ITU-T SG 16 WP 3 and ISO/IEC JTC 1/SC 29, 26th Meeting, by teleconference, Apr. 20-29, 2022.

Input document to JVET, "AHG12: Enhanced CCLM", JVET-Z0140-v4, Joint Video Experts Team (JVET) of ITU-T SG 16 WP 3 and ISO/IEC JTC 1/SC 29, 26th Meeting, by teleconference, Apr. 20-29, 2022.

Input document to JVET, "AHG12: Slope adjustment for CCLM", JVET-Y0055-v2, Joint Video Experts Team (JVET) of ITU-T SG 16 WP 3 and ISO/IEC JTC 1/SC 29 25th Meeting, by teleconference, Jan. 12-21, 2022.

Output document approved by JVET, Versatile Video Coding (Draft 10), JVET-S2001-vG, Joint Video Experts Team (JVET) of ITU-T SG 16 WP 3 and ISO/IEC JTC 1/SC 29/WG 11, 19th Meeting: by teleconference, Jun. 22-Jul. 1, 2020.

Output document of JVET, "Algorithm description for Versatile Video Coding and Test Model 11(VTM 11)",JVET-T2002-v5, Joint Video Experts Team (JVET) of ITU-T SG 16 WP 3 and ISO/IEC JTC 1/SC 29, 20th Meeting, by teleconference, Oct. 7-16, 2020.

Non-Final Rejection dated Sep. 30, 2024 for U.S. Appl. No. 18/210,839 which is the family member application of the instant application.

Final Rejection dated Feb. 6, 2025 for U.S. Appl. No. 18/210,839 which is the family member application of the instant application.

Notice of Allowance dated May 21, 2025 for U.S. Appl. No. 18/210,839 which is the family member application of the instant application.

* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/353,227, filed on Jun. 17, 2022, entitled "Chroma Prediction Mode Derivation Based on Template Matching," and U.S. Provisional Patent Application Ser. No. 63/356,345, filed on Jun. 28, 2022, entitled "Modifications on GPM Blending Derivation," the contents of all of which are hereby incorporated herein fully by reference in their entirety.

FIELD

The present disclosure is generally related to video coding and, more specifically, to techniques for selecting a blending width in a geometric partitioning mode (GPM).

BACKGROUND

Geometric partitioning mode (GPM) is a coding tool for a video coding method, in which an encoder may select two merge candidates out of several merge candidates for predicting a block unit in an image frame and may provide two merge indices into a bitstream for a decoder to recognize the selected merge candidates.

The encoder and the decoder may predict the block unit based on the selected merge candidates to generate predicted blocks and then weightedly combine the predicted blocks based on a partition line and a blending width when the GPM is applied on the block unit. However, a single blending width may not match several color distributions in the image frames. Thus, the encoder and the decoder need to precisely select a blending width from a plurality of width candidates to match the color distribution for each of the block units.

Furthermore, since the number of bits for the last one of the candidate widths is greater than the number of bits for the first one of the candidate widths, the number of bits will increase if the last one of the candidate widths for each block in an image frame is always selected, which may negatively impact the coding efficiency.

Therefore, there is a need for precisely and efficiently selecting the blending width.

SUMMARY

The present disclosure is directed to a device and method for selecting a blending width in a geometric partitioning mode (GPM).

In a first aspect of the present disclosure, a method of decoding video data and an electronic device for performing the method are provided. The method includes receiving the video data; determining a block unit from a current frame included in the video data; determining, from a plurality of candidate lines, a partitioning line for dividing the block unit into a pair of geometric partitions using a geometric partitioning mode; determining two different prediction modes of the block unit from a plurality of candidate modes to generate two predicted blocks for the pair of the geometric partitions; determining a blending width of the partitioning line from a plurality of candidate widths based on a block size of the block unit; and weightedly combining the two predicted blocks along the partitioning line based on the blending width to reconstruct the block unit.

An implementation of the first aspect further includes comparing the block size of the block unit with a threshold size; and determining the blending width of the partitioning line from the plurality of candidate widths based on the comparison between the block size and the threshold size.

In an implementation of the first aspect, the blending width of the partitioning line is a predefined one of the plurality of candidate widths when the block size is equal to or less than the threshold size.

An implementation of the first aspect further includes determining, from the current frame, a block template region adjacent to the block unit; predicting the block template region based on the two different prediction modes to generate two predicted template regions; weightedly combining the two predicted template regions along the partitioning line based on each of the plurality of candidate widths to generate a plurality of template prediction regions; determining a cost value between the block template region and each of the plurality of template prediction regions; and determining the blending width of the partitioning line from the plurality of candidate widths based on the cost values of the plurality associated with template prediction regions.

An implementation of the first aspect further includes determining an arrangement of the plurality of candidate widths based on the cost values; and determining the blending width of the partitioning line from the plurality of candidate widths based on the arrangement and a width index of the block unit determined based on the video data.

An implementation of the first aspect further includes determining a minimum one of the cost values; and determining one of the plurality of candidate widths as the blending width of the partitioning line without parsing a width index indicating the blending width of the block unit, the one of the plurality of candidate widths corresponding to the minimum one of the cost values.

In an implementation of the first aspect, the block template region includes at least one of an above adjacent region located above the block unit, a left adjacent region located to a left side of the block unit, or an above-left adjacent region located to a top-left side of the block unit.

In an implementation of the first aspect, the cost value for each of the plurality of template prediction regions is a template-matching cost value determined by comparing a plurality of reconstructed samples in the block template region with a plurality of predicted samples in a corresponding one of the plurality of template prediction regions.

An implementation of the first aspect further includes determining, for the block unit, a number of the plurality of candidate widths based on the block size of the block unit.

In an implementation of the first aspect, the block size of the block unit has a block height H and a block width W of the block unit; the number of the plurality of candidate widths for the block unit having the block width W greater than a product of N1 and the block height H (N1×H) or having the block height H greater than a product of N2 and the block width W (N2×W) is less than the number of the plurality of candidate widths for the block unit having the block width W less than or equal to the product of N1 and the block height H (N1×H) and having the block height H less than or equal to the product of N2 and the block width W (N2×W); and N1 and N2 are positive integers greater than or equal to one.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
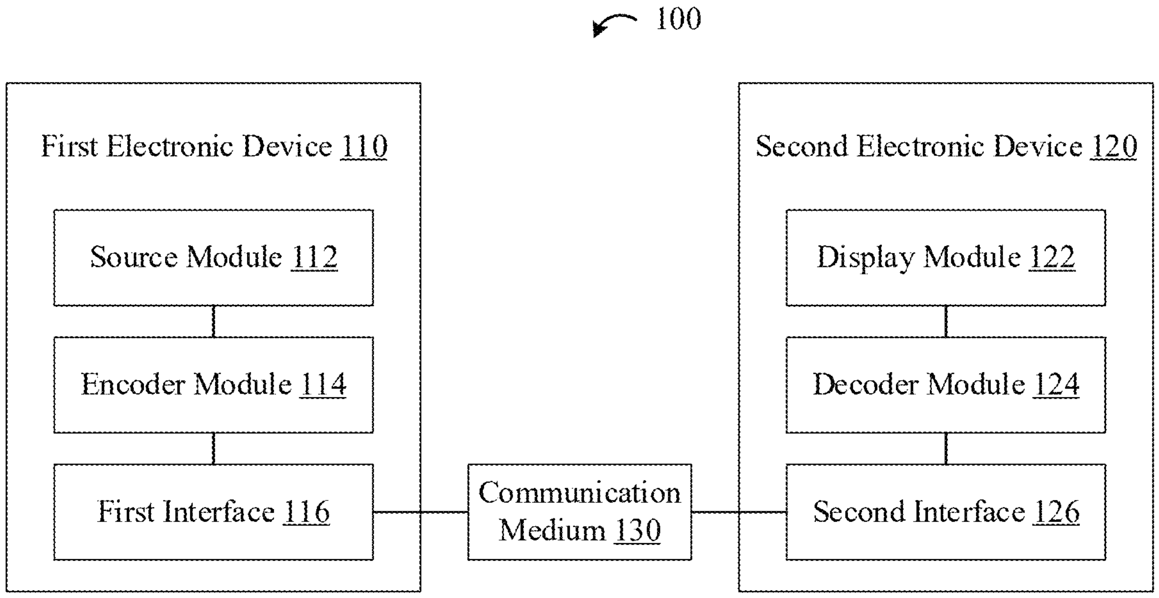
FIG. 1 illustrates a block diagram of a system having a first electronic device and a second electronic device for encoding and decoding video data, in accordance with one or more techniques of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and case of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function (s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 illustrates a block diagram of a system 100 having a first electronic device and a second electronic device for encoding and decoding video data, in accordance with one or more techniques of this disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the computer-executable instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
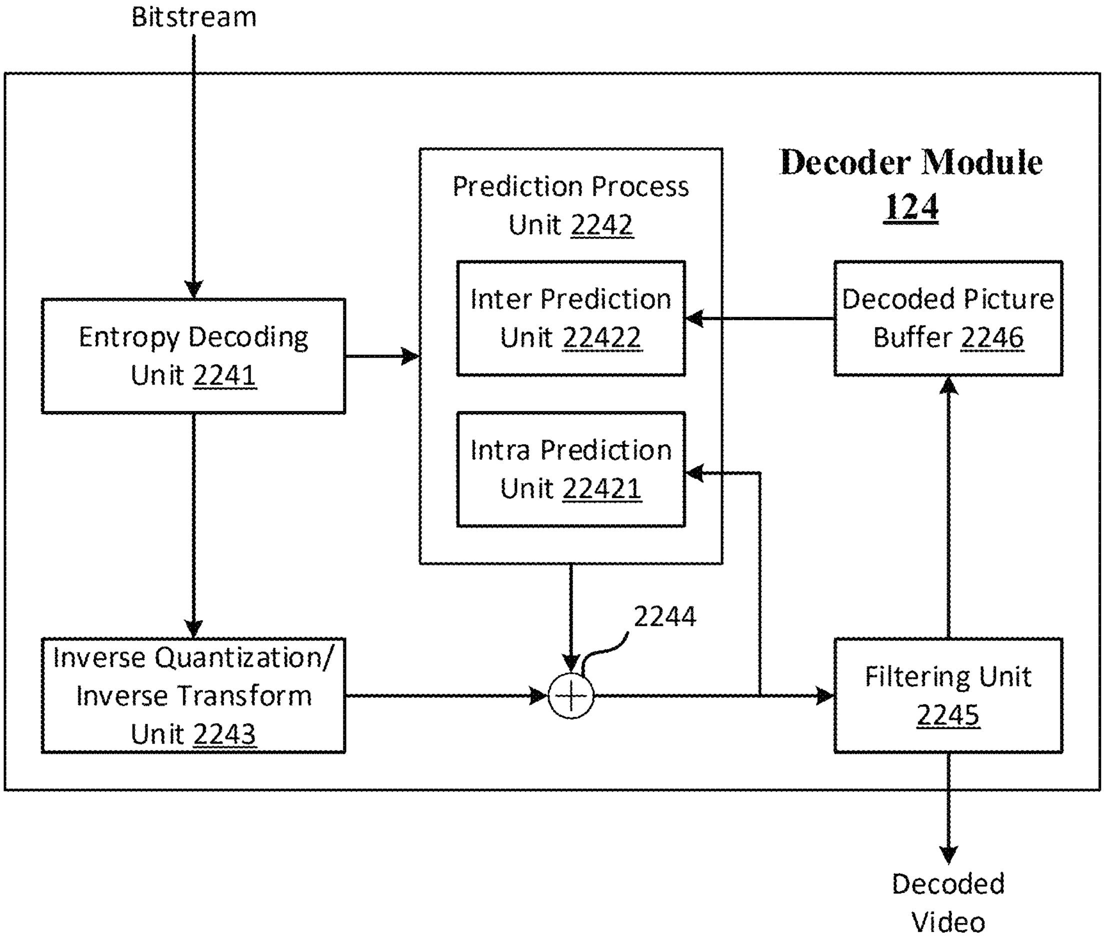
FIG. 2 illustrates a block diagram of a decoder module of the second electronic device illustrated in FIG. 1, in accordance with one or more techniques of this disclosure.

FIG. 2 illustrates a block diagram of the decoder module 124 of the second electronic device 120 illustrated in FIG. 1, in accordance with one or more techniques of this disclosure. The decoder module 124 includes an entropy decoder (e.g., an entropy decoding unit 2241), a prediction processor (e.g., a prediction process unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction process unit 2242 further includes an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loeve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
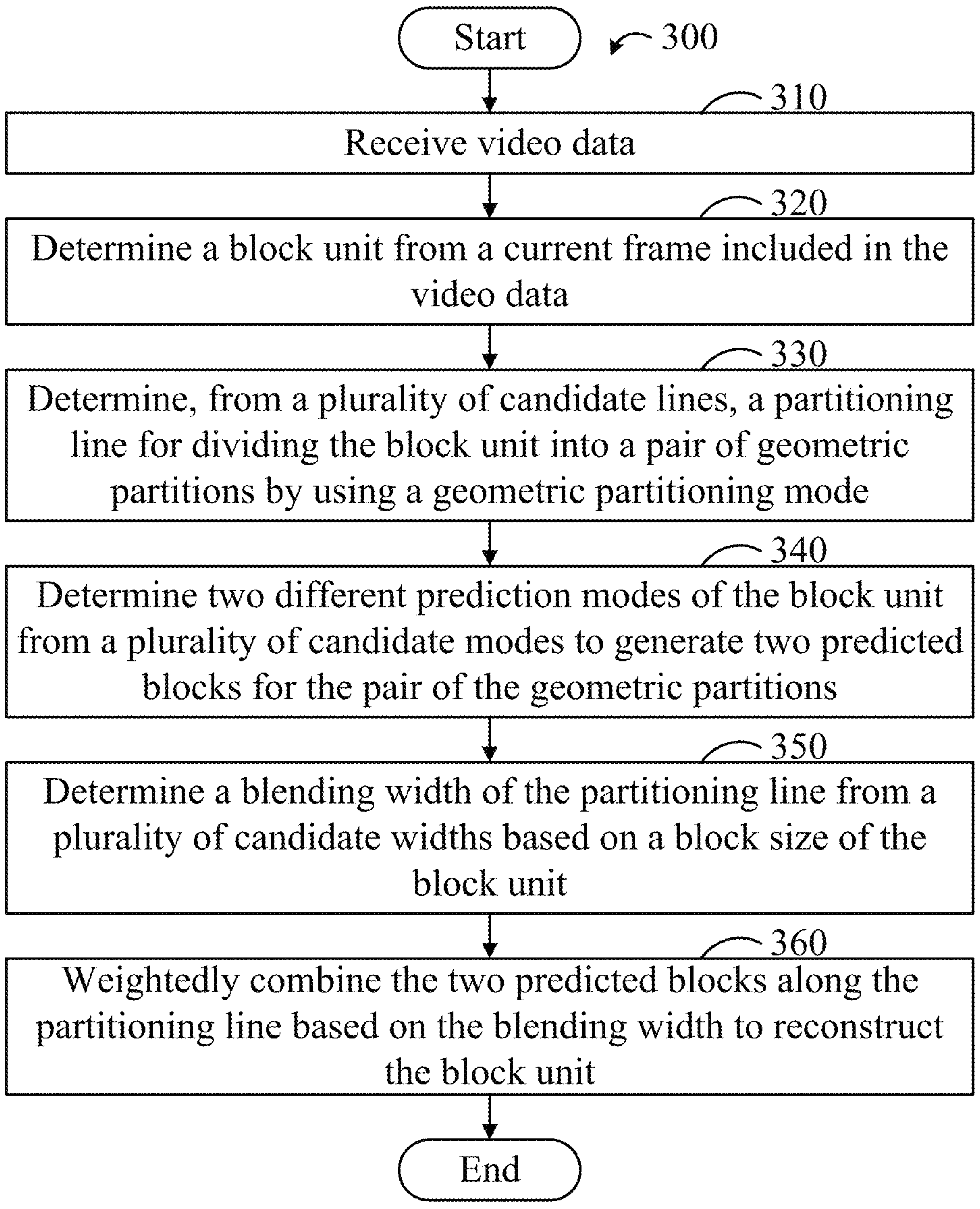
FIG. 3 illustrates a flowchart of a method for decoding and/or encoding video data by an electronic device, in accordance with one or more techniques of this disclosure.

FIG. 3 illustrates a flowchart of a method 300 for decoding and/or encoding video data by an electronic device, in accordance with one or more techniques of this disclosure. The method 300 is an example only, as there are a variety of ways of decoding the video data.

The method 300 may be performed using the configurations illustrated in FIGS. 1 and 2, and various elements of these figures are referenced with the description of the method 300. Each block illustrated in FIG. 3 may represent one or more processes, methods, or subroutines performed.

The order in which the blocks appear in FIG. 3 is for illustration only, and is not intended to limit the scope of the present disclosure, thus may change. Additional blocks may be added or fewer blocks may be utilized without departing from the present disclosure.

At block 310, the decoder module 124 receives video data. The video data received by the decoder module 124 may be a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine the block unit according to the partition indications based on any video coding standard.

At block 330, the decoder module 124 determines, from a plurality of candidate lines, a partitioning line for dividing the block unit into a pair of geometric partitions by using a GPM.

With reference to FIGS. 1 and 2, the decoder module 124 may determine the partitioning line of the block unit from the candidate lines when the prediction indications indicate that the block unit is predicted by the GPM (e.g., when a block-level GPM enabled flag of the block unit is true). The decoder module 124 may divide the block unit into the pair of geometric partitions along the partitioning line when the decoder module 124 selects the partitioning line of the block unit for reconstructing the block unit by using the GPM.

In some implementations, the prediction indications may include a partition index of the GPM for the block unit. The partition index may indicate the partitioning line of the block unit selected from the candidate lines. In some implementations, the partitioning line may be one of a diagonal split line and an anti-diagonal direction when the partition index is a triangle partition index. In some implementations, the partition index may indicate a partition angle index and a partition distance index when the partition index is a geometric partition index. The partition angle index may indicate an inclined angle of the partitioning line, and the partition distance index may indicate a line offset between the partitioning line and a center point of the block unit. Thus, the partitioning line may be determined based on the inclined angle and the line offset indicated by the partition index. In some implementations, the partition index may be an index merge_gpm_partition_idx, the partition angle index may be an index angleIdx, and the partition distance index may be an index distanceIdx. In some implementations, the partition index may be an index partition_mode_idx determined based on sgpm_cand_idx.

At block 340, the decoder module 124 determines two different prediction modes of the block unit from a plurality of candidate modes to generate two predicted blocks for the pair of the geometric partitions.

With reference to FIGS. 1 and 2, the decoder module 124 may determine a first prediction mode from the candidate modes for one of the geometric partitions, and determine a second prediction mode from the candidate modes for the other one of the geometric partitions. The decoder module 124 may predict the block unit based on the first prediction mode and the second prediction mode to generate the two predicted blocks.

In some implementations, the first prediction mode may be different from the second prediction mode. The prediction indications may include a first prediction index and a second prediction index. The first prediction index may indicate the first prediction mode included in at least one of a motion candidate list or an intra prediction list, and the second prediction index may indicate the second prediction mode in at least one of the motion candidate list or the intra prediction list.

In some implementations, the intra prediction list may be an intra candidate list and the candidate modes may include a plurality of intra candidate modes (e.g., a planar mode, a parallel mode, and a perpendicular mode) selected from a plurality of intra predefined modes. In some implementations, a direction of the parallel mode may be completely or nearly parallel to the partitioning line, and a direction of the perpendicular mode may be completely or nearly perpendicular to the partitioning line. In some implementations, the intra candidate list may be a most probable mode (MPM) list. The MPM list may include at least one of a plurality of primary MPMs or a plurality of secondary MPMs in Versatile Video Coding (VVC) or Enhanced Compression Mode (ECM). The MPM list may include a plurality of MPMs in a spatial GPM of ECM.

In some implementations, the motion candidate list may be a merge candidate list and the candidate modes may include a plurality of merge candidate modes. In some implementations, the merge candidate modes in the merge candidate list may be selected from a plurality of spatial motion prediction modes of a plurality of neighboring blocks neighboring the block unit, a plurality of temporal motion prediction modes of a plurality of collocated blocks, history-based motion prediction modes stored in a first-in-first-out (FIFO) table, a plurality of pair-wise average motion prediction modes, and a zero motion mode. In some implementations, the first prediction mode may indicate a first reference frame and a first reference vector, and the second prediction mode may indicate a second reference frame and a second reference vector. The first reference frame and the second reference frame may be selected from a plurality of reference lists of the block unit. In some implementations, the first reference frame and the second reference frame may be selected from the same one of the reference lists. In some implementations, the first reference frame and the second reference frame may be selected from different reference lists. In some implementations, the number of the reference lists may be equal to 2. In some implementations, the merge candidate list may be a GPM merge list and the candidate modes may include a plurality of GPM merge modes. Thus, the first prediction index and the second prediction index may be two indices, merge_gpm_idx0 and merge_gpm_idx1, when the first prediction mode and the second prediction mode are selected from the GPM merge list.

In some implementations, there may be a GPM set index for simultaneously selecting the partitioning line and the two different prediction modes. In other words, the decoder module 124 may select a GPM parameter set from a plurality of GPM candidate sets in a GPM set list. Each of the GPM candidate sets may include one of the candidate lines and further include two of the candidate modes. Thus, when the decoder module 124 determines the GPM parameter set based on the GPM set index, the decoder module 124 may determine the partitioning lines and the two different prediction modes at the same time.

At block 350, the decoder module 124 determines a blending width of the partitioning line from a plurality of candidate widths based on a block size of the block unit.

With reference to FIGS. 1 and 2, the decoder module 124 may determine the blending width from the candidate widths based on the block size of the block unit. In some implementations, the blending width may be selected from the candidate widths without parsing a width index indicating the blending width of the block unit. In some implementations, the candidate widths may be included in a first width candidate list.

Figure 4A:
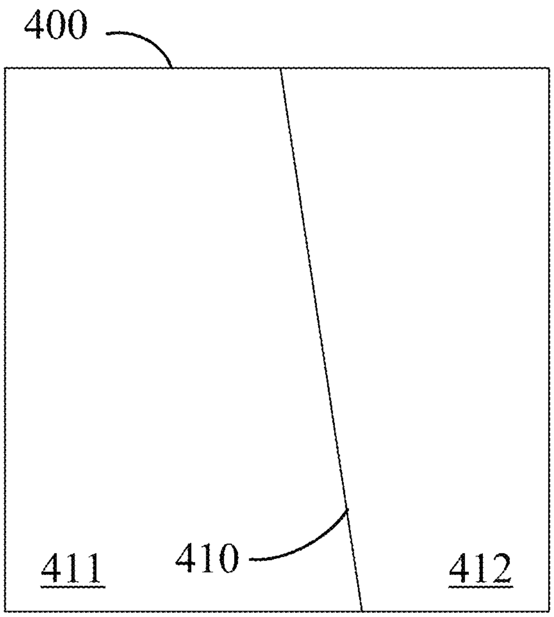
FIG. 4A illustrates an example implementation of a pair of geometric partitions divided from a block unit along a partitioning line, in accordance with one or more techniques of this disclosure.
Figure 4B:
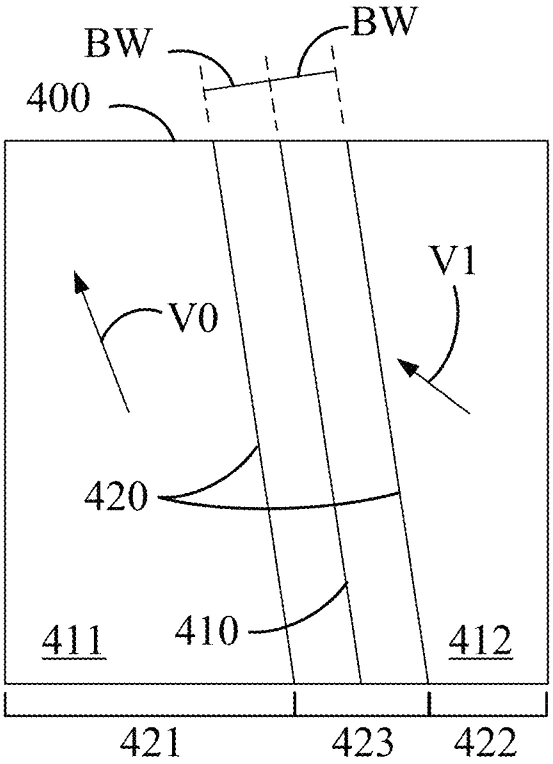
FIG. 4B illustrates an example implementation of the block unit having different prediction areas separated based on the partitioning line and a blending width, in accordance with one or more techniques of this disclosure.

FIG. 4A illustrates an example implementation of a pair of geometric partitions 411 and 412 divided from a block unit 400 along a partitioning line 410, in accordance with one or more techniques of this disclosure. FIG. 4B illustrates an example implementation of the block unit 400 having different prediction areas 421, 422, and 423 separated based on the partitioning line 410 and a blending width (BW), in accordance with one or more techniques of this disclosure. The prediction indications of the block unit 400 may indicate the partitioning line 410, a first reference vector V0, a second reference vector V1, a first reference frame, and a second reference frame (not explicitly shown). The block unit 400 may be divided based on the partitioning line 410 to determine the geometric partitions 411 and 412. In order to predict the block unit 400 by using the GPM, the decoder module 124 may determine the prediction areas 421, 422, and 423 based on the partitioning line 410 and the blending width.

A pair of blending lines 420 neighboring the partitioning line 410 may divide the block unit 400 into the prediction areas 421, 422, and 423. A distance between the partitioning line 410 and each of the blending lines 420 may be equal to the blending width. The first prediction area 421 may be divided by a first one of the blending lines 420 that is included in the geometric partition 411 corresponding to the first prediction area 421, and the second prediction area 422 may be divided by a second one of the blending lines 420 that is included in the geometric partition 412 corresponding to the second prediction area 422. In addition, the third prediction area 423 may be divided from the block unit 400 by the pair of blending lines 420.

In some implementations, the decoder module 124 may select the blending width from the candidate widths. In some implementations, the candidate widths may include ½, 1, 2, 4, and 8. In some implementations, the candidate widths may include 0, θ/2, θ, 2θ, and 4θ. In some implementations, the candidate widths may include θ/4, θ, and 4θ. In some implementations, a width unit θ may be equal to 2, 4, or other positive integers. For example, the candidate width equal to one may be equal to a distance between two neighboring ones of a plurality of samples in the current frame.

The blending width of the partitioning line 410 may be determined from the candidate widths based on a block size of the block unit 400. In some implementations, the block size of the block unit 400 may be compared with a size threshold. In some implementations, the blending width of the partitioning line may be determined from the plurality of candidate widths only and directly based on the comparison between the block size and the size threshold without considering the any other parameters. In other words, the decoder module 124 may compare the block size of the block unit 400 with the size threshold to directly select the blending width of the partitioning line 410 from the candidate widths without parsing any syntax indicating the blending width. In some implementations, the size threshold may be a positive integer equal to 16, 24, 32, 64, or other integers.

In some implementations, the block size may be a width W of the block unit 400. In some implementations, the block size may be a height H of the block unit 400. In some implementations, the block size may be a size value generated by multiplying the width W of the block unit 400 by the height H of the block unit 400. In some implementations, the block size may be a size value generated by dividing the width W of the block unit 400 by the height H of the block unit 400. In some implementations, the block size may be a size value generated by dividing the height H of the block unit 400 by the width W of the block unit 400. In some implementations, the block size may be calculated based on at least one of the width W of the block unit 400 or the height H of the block unit 400.

The blending width of the partitioning line 410 may be a predefined one of the candidate widths when the block size is equal to or less than the size threshold. Thus, when the decoder module 124 determines that the block size of the block unit 400 is equal to or less than the size threshold, the decoder module 124 may directly select the predefined one of the candidate widths without parsing any other syntax indicating the blending width of the block units. Thus, when the block size of the block unit 400 is small, the number of bits in the bitstream may be reduced and a coding efficiency may be increased. In addition, when the decoder module 124 determines that the block size of the block unit 400 is greater than the size threshold, the decoder module 124 may select the blending width from the candidate widths based on the other parameters or any other syntax indicating the blending width.

In some implementations, the number of the candidate widths may be determined based on the block size of the block unit 400. In some implementations, the number of the candidate widths of the partitioning line 410 for the block unit 400, having the block width W greater than N1×H or having the block height H greater than N2×W, may be less than the number of the candidate widths of the partitioning line 410 for the block unit 400, having the block width W less than or equal to N1×H and having the block height H less than or equal to N2×W. In some implementations, the numbers N1 and N2 may be positive integers greater than or equal to one. In addition, the number N1 may be equal to or different from the number N2.

In some implementations, the number N1 may be a size threshold when the block size is the size value generated by dividing the width W of the block unit 400 by the height H of the block unit 400. In some implementations, the number N2 may be a size threshold when the block size is a size value generated by dividing the height H of the block unit 400 by the width W of the block unit 400. In addition, the block unit 400 having the block width W greater than N1×H or having the block height H greater than N2×W may be narrower than another block having a block width W' less than or equal to N1×H' and having a block height H' less than or equal to N2×W'. Thus, the number of the candidate widths may also be determined based on a block shape of the block unit 400. In some implementations, a small blending width may be appropriate for a sharp block (e.g., a narrow block) having the block width W greater than N1×H or having the block height H greater than N2×W, and a large blending width may be appropriate for a flat block (e.g., a wide block) having the block width W less than or equal to N1×H and having the block height H less than or equal to N2×W.

Figure 5A:
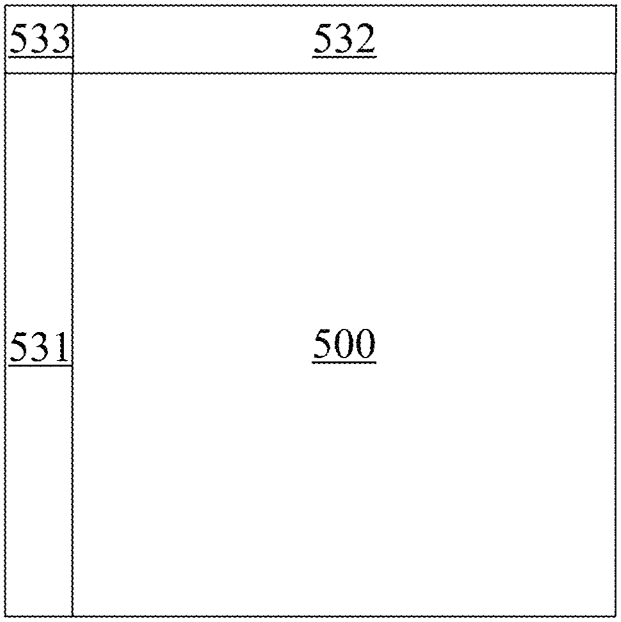
FIG. 5A illustrates an example implementation of a block unit and a plurality of adjacent regions, in accordance with one or more techniques of this disclosure.

In some implementations, the decoder module 124 may determine a block template region adjacent to the block unit from the current frame. FIG. 5A illustrates an example implementation of a block unit 500 and a plurality of adjacent regions 531, 532, and 533, in accordance with one or more techniques of this disclosure. A first adjacent region 531 may be a left adjacent region located to the left side of the block unit 500, a second adjacent region 532 may be an above adjacent region located above the block unit 500, and a third adjacent region 533 may be an above-left adjacent region located to the top-left side of the block unit 500. The adjacent regions 531-533 are reconstructed prior to reconstructing the block unit 500. A height of the left adjacent region 531 may be equal to a height H of the block unit 500, and a width of the left adjacent region 531 may be equal to a number S of the reconstructed samples of the first adjacent region 531 along a horizontal direction. A height of the above adjacent region 532 may be equal to a number R of the reconstructed samples of the second adjacent region 532 along a vertical direction, and a width of the above adjacent region 532 may be equal to a width W of the block unit 500. In addition, a height of the above-left adjacent region 533 may be equal to the number R of the reconstructed samples of the second adjacent region 532 along the vertical direction, and a width of the above-left adjacent region 533 may be equal to the number S of the reconstructed samples of the first adjacent region 531 along the horizontal direction. In one implementation, the numbers, R and S, may be positive integers. In addition, the numbers, R and S, may be equal to or different from each other. Furthermore, the numbers, R and S, may be greater than or equal to one.

The decoder module 124 may use the adjacent regions 531-533 as the block template region for predicting the block unit 500. In addition, the decoder module 124 may use two of the adjacent regions 531-533 as the block template region for predicting the block unit 500. For example, the decoder module 124 may only use the first and second adjacent regions 531 and 532 as the block template region for predicting the block unit 500. In other implementations, the decoder module 124 may only use one of the adjacent regions 531-533 as the block template region for predicting the block unit 500. Thus, the block template region may include at least one of the above adjacent region located above the block unit 500, the left adjacent region located to the left side of the block unit 500, or the above-left adjacent region located to the top-left side of the block unit 500.

Figure 5B:
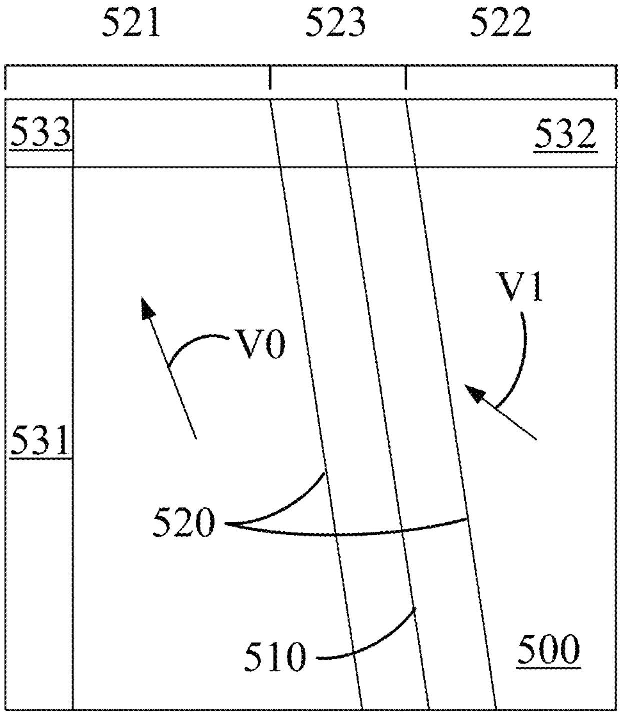
FIG. 5B illustrates an example implementation of the block unit and the adjacent regions having different prediction areas separated based on the partitioning line and a pair of blending lines, in accordance with one or more techniques of this disclosure.

The partitioning line 410 in FIG. 4B may extend towards a specific one of the adjacent regions 531-533 to generate the partitioning line 510 in FIG. 5B. Thus, the block template region may include the specific adjacent region (e.g., the adjacent region 532 in FIG. 5B) divided by the partitioning line 510. In some implementations, the first adjacent region 531 may be included in the block template region when the width W of the block unit 500 may be less than the height H of the block unit 500. In some implementations, the first and the third adjacent regions 531 and 533 may be included in the block template region when the width W of the block unit 500 is less than the height H of the block unit 500. In some implementations, the second adjacent region 532 may be included in the block template region when the width W of the block unit 500 is greater than the height H of the block unit 500. In some implementations, the second and the third adjacent regions 532 and 533 may be included in the block template region when the width W of the block unit 500 is greater than the height H of the block unit 500. In some implementations, the first and the second adjacent regions 531 and 532 may be included in the block template region when the width W of the block unit 500 is equal to the height H of the block unit 500. In some implementations, the adjacent regions 531-533 may be included in the block template region when the width W of the block unit 500 may be equal to the height H of the block unit 500.

The decoder module 124 may predict the block template region based on the two different prediction modes to generate two predicted template regions. In other words, the block template region may be predicted based on the first prediction mode and the second prediction mode to generate the two predicted template regions. In some implementations, the first prediction mode may indicate the first reference frame and the first reference vector, and the second prediction mode may indicate the second reference frame and the second reference vector. The decoder module 124 may weightedly combine the two predicted template regions along the partitioning line based on the plurality of candidate widths to generate a plurality of template prediction regions. FIG. 5B illustrates an example implementation of the block unit 500 and the adjacent regions 531-533 having different prediction areas 521-523 separated based on the partitioning line 510 and a pair of blending lines 520, in accordance with one or more techniques of this disclosure. In some implementations, a distance between the partitioning line 510 and each of the blending lines 520 may be identical to one of the candidate widths. In some implementations, the partitioning line 510 and the blending lines 520 may be extended into one or more of the adjacent regions 531-533.

In FIG. 5B, the second adjacent region 532 may be divided into a left portion, a central portion, and a right portion by the pair of the blending lines 520. Thus, the decoder module 124 may determine that the adjacent regions 531 and 533 and the left portion of the adjacent region 532 may be included in a first prediction area 521, the right portion of the adjacent region 532 may be included in a second prediction area 522, and the central portion of the adjacent region 532 may be included in a third prediction area 523. Thus, when the two predicted template regions are weightedly combined along the partitioning line 510 based on one of the candidate width to generate a corresponding one of the template prediction regions, the adjacent regions 531 and 533 and the left portion of the adjacent region 532 may be predicted based on the first prediction mode, the right portion of the adjacent region 532 may be predicted based on the second prediction mode, and the central portion of the adjacent region 532 may be predicted based on the first prediction mode, the second prediction mode and two different weighting parameters. In some implementations, the weighted combination may be executed based on a plurality of weighting values for each adjacent region.

The decoder module 124 may determine two blending matrices (e.g., W0 and W1) for the two predicted template regions. A plurality of weight values in the two blending matrices may be within a range of 0 to P (e.g., [0, P]). In some implementations, the number P may be a positive integer (e.g., 8). The weight values in the two blending matrices may be derived based on a displacement d(xc, yc) between a sample position (xc, yc) to the partitioning line. In some implementations, the weight values may be given by a discrete ramp function with the displacement and a corresponding one of the candidate width CWn. In some implementations, the number CWn may be a positive integer. For example, the weight values in the blending matrices may be given by a ramp function as follow:

$$w(xc, yc) = \begin{cases} 0 & d(xc, yc) \le -CWn \\ \left(8/(2\times CWn)\right)\times(d(xc, yc)+CWn) & -CWn < d(xc, yc) \le CWn \\ 8 & d(xc, yc) \ge CWn \end{cases}$$

In addition, the weight values in the blending matrices may be given by another ramp function as follow:

$$w(xc, yc) = \begin{cases} Clip3(0,\ 32,\ (d(xc, yc) + (16\times CWn) + (CWn >> 1)) >> \log_2 CWn) & CWn \ne 0 \\ (d(xc,\ yc) > 0)?32:0 & CWn = 0 \end{cases}$$

The function a>>b indicates an arithmetic right shift of a two's complement integer representation of a by b binary digits. The function a?b:c indicates that the result is equal to b when a is true and that the result is equal to c when a is false. The function Clip3 (a, b, c) indicates that the result is equal to a when z is less than a, that the result is equal to b when z is greater than b, and that the result is equal to c when z is greater than or equal to a and less than or equal to b. In some implementations, the weight values may be determined by any other function based on the displacement d(xc, yc) between a sample position (xc, yc) to the partitioning line.

The decoder module 124 may weightedly combine the two predicted template regions as follows:

$$R_p = W0\times R_{P0} + W1\times R_{P1}$$

$R_p$ may be one of the template prediction regions of the block unit generated by using a corresponding one of the candidate widths. W0 may be a first blending matrix for the first prediction mode. W1 may be a second blending matrix for the second prediction mode. $R_{P0}$ may be a first one of the two predicted template regions generated by using the first prediction mode. $R_{P1}$ may be a last one of the two predicted template regions generated by using the second prediction mode.

In some implementation, the blending lines 520 may be determined when the two predicted template regions are weighted combined based on the two blending matrices. For example, the weighting values of the second blending matrix W1 for the first prediction area 521 are equal to zero, so the first prediction area 521 is predicted only based on the first prediction mode without considering the second prediction mode. In addition, the weighting values of the first blending matrix W0 for the second prediction area 522 are equal to zero, so the second prediction area 522 are predicted only based on the second prediction mode without considering the first prediction mode. In the third prediction area 523, at least one of the weighting values of the first blending matrix W0 is different from zero and at least one of the weighting values of the second blending matrix W is different from zero, so the third prediction area 523 is predicted based on the first prediction mode and the second prediction mode.

The decoder module 124 may determine a cost value between the block template region and each of the template prediction regions. Since the block template region is reconstructed prior to reconstructing the block unit 500, the decoder module 124 may directly receive a reconstructed result of the block template region. The decoder module 124 may derive the cost values between the block template region and the template prediction regions by an intra template matching. The intra template matching (TM) may be calculated based on a difference between the reconstructed result and each of the template prediction regions. The reconstructed result may include a plurality of reconstructed samples of the block template region, and each of the template prediction regions may include a plurality of predicted samples for the block template region. Thus, the cost value for each of the template prediction regions is a TM cost value determined by comparing the reconstructed samples of the block template region with the predicted samples for a corresponding one of the template prediction regions.

The difference between the reconstructed result and one of the template prediction regions may be calculated based on a Mean Squared Error (MSE) calculation. In addition, the difference between the reconstructed result and one of the template prediction regions may be calculated based on a Sum of Absolute Difference (SAD) calculation. In some implementations, the difference between the reconstructed result and one of the template prediction regions may be calculated based on a Sum of Absolute Transformed Difference (SATD) calculation. Each of the differences generated by calculating between the reconstructed result and the template prediction regions may be regarded as a TM cost.

The template prediction regions each generated for the block template region based on a corresponding one of the candidate widths may be compared with the reconstructed result of the block template region for generating the cost values. Thus, the number of the candidate widths may be both equal to the number of the template prediction regions and the number of the cost values. Thus, when the number of the candidate widths is equal to a value M, the number of the cost values may be equal to the value M.

The decoder module 124 may determine the blending width of the partitioning line 510 from the candidate widths based on the cost values of the template prediction regions. The decoder module 124 may determine an arrangement of the candidate widths based on the cost values and reorder the candidate widths based on the arrangement. In some implementations, the candidate widths may be reordered in an ascending order or a descending order of the cost values.

Before the arrangement is determined based on the cost values, the candidate widths may be ordered based on arbitrary rules. For example, the candidate widths may be ordered based on a width of the candidate widths.

The candidate widths may be reordered in the ascending order of the cost values. Thus, when the cost value of a specific one of the candidate widths is less than the cost values of the other candidate widths, the specific candidate width may be moved forward to be a first candidate width based on the arrangement. In other words, the specific candidate width may be moved to be the first candidate width when the cost value of the specific candidate width is the minimum of the cost values of the candidate widths. In addition, the specific candidate width may be moved to be the last one of the candidate widths when the cost value of the specific candidate width is the maximum of the cost values of the candidate widths. For example, the candidate widths may include five candidate widths CW1, CW2, CW3, CW4 and CW5 having five cost values CV1, CV2, CV3, CV4, and CV5, respectively. When a value order of the five cost values is CV4>CV2>CV5>CV1>CV3, the arrangement of the candidate widths may be changed from an original order of the five candidate widths CW1, CW2, CW3, CW4, and CW5 to a new order of the five candidate widths CW3, CW1, CW5, CW2, and CW4.

The arrangement may be further determined by adjusting the new order of the candidate widths based on a diversity criterion. The decoder module 124 may determine a difference value between two of the cost values selected from two neighboring ones of the candidate widths ordered in the new order. When the difference value is less than or equal to a diversity threshold, the last one of the two neighboring ones of the candidate widths may be moved backward. For example, when the value order of the five cost values is CV4>CV2>CV5>CV1>CV3, and the difference between two of the cost values CV5 and CV1 is less than the diversity threshold, then the candidate width CW5 may be moved backward. Therefore, the arrangement of the candidate widths may be further changed from the new order of the five candidate widths CW3, CW1, CW5, CW2, and CW4 to another new (or final) order of the five candidate widths CW3, CW1, CW2, CW5, and CW4. In some implementations, the arrangement may not be determined by adjusting the new order of the five candidate widths based on the diversity criterion, such that the arrangement may be identical to the new order of the five candidate widths.

The decoder module 124 may select K candidate widths having the least cost values from the candidate widths and add the selected candidate widths into a second width candidate list. The number K, being a positive integer, may be equal to the number of the candidate widths in the second width candidate list and less than the total number of the candidate widths. In other words, the decoder module 124 may select the first to the K-th candidate widths ordered based on the arrangement when the candidate widths are reordered in the ascending order of the cost values to generate the arrangement. Each of the candidate widths in the second width candidate list may have a width index value. Thus, the width index value for the second width candidate list may be within an index range of 0 to K−1 since the number of the candidate widths in the second width candidate list is equal to K. In some implementations, a size of the first width candidate list may be greater than a size of the second width candidate list. In other words, the number of candidate widths in the first width candidate list may be greater than the number of candidate widths in the second width candidate list.

The decoder module 124 may determine the blending width of the partitioning line 510 from the candidate widths based on at least one of the arrangement or a width index of the block unit 500 determined based on the bitstream. In some implementations, a minimum one of the cost values may be determined, and then one of the candidate widths corresponding to the minimum one of the cost values may be directly determined as the blending width without parsing the width index. Thus, the number of bits in the bitstream may be reduced. In some implementations, the width index may be parsed for the block unit 500 for selecting the blending width from the first width candidate list arranged based on the arrangement. In some implementations, the width index may be parsed for the block unit 500 for selecting the blending width from the second width candidate list. The candidate width having a lower cost value may have a lower width index value. Thus, since the candidate width having a lower cost value may be more easily selected than the candidate width having a higher cost value, the number of bits in the bitstream may also be reduced.

In some implementations, the decoder module 124 may determine the number of the candidate widths based on the block size of the block unit, and then determine the blending width based on the number of the candidate widths by using the block template region and the intra template matching. In some implementations, the decoder module 124 may directly determine the candidate widths from the first width candidate list without considering the block size of the block unit, and then determine the blending width from the candidate widths in the first width candidate list by using the block template region and the intra template matching.

Referring back to FIG. 3, at block 360, the decoder module 124 weightedly combines the two predicted blocks along the partitioning line based on the blending width to reconstruct the block unit.

With reference to FIGS. 1 and 2, the decoder module 124 may determine two blending matrices (e.g., W0 and W1) for the two predicted blocks. A plurality of weight values in the two blending matrices may be within a range of 0 to P (e.g., [0, P]). In some implementations, the number P may be a positive integer (e.g., 8). The weight values in the two blending matrices may be derived based on a displacement d(xc, yc) between a sample position (xc, yc) to the partitioning line. In some implementations, the weight values may be given by a discrete ramp function with the displacement and the blending width (BW). In some implementations, BW may be a positive integer. For example, the weight values in the blending matrices may be given by the ramp function as follow:

$$w(xc, yc) = \begin{cases} 0 & d(xc, yc) \le -BW \\ \left(8/(2 \times BW)\right) \times (d(xc, yc) + BW) & -BW < d(xc, yc) \le BW \\ 8 & d(xc, yc) \ge BW \end{cases}$$

In addition, the weight values in the blending matrices may be given by another ramp function as follow:

$$w(xc, yc) = \begin{cases} Clip3(0, 32, (d(xc, yc) + (16 \times CWn) + (CWn >> 1)) >> \log_2 CWn) & CWn \ne 0 \\ (d(xc, yc) > 0)?32:0 & CWn = 0 \end{cases}$$

The function a>>b indicates an arithmetic right shift of a two's complement integer representation of a by b binary digits. The function a?b:c indicates that the result is equal to b when a is true and that the result is equal to c when a is false. The function Clip3 (a, b, c) indicates that the result is equal to a when z is less than a, that the result is equal to b when z is greater than b, and that the result is equal to c when z is greater than or equal to a and less than or equal to b. In some implementations, the weight values may be determined by any other function based on the displacement d(xc, yc) between a sample position (xc, yc) to the partitioning line.

The decoder module 124 may weightedly combine the two predicted blocks along the partitioning line based on the blending width to generate a prediction block. In some implementations, with reference to FIG. 4, the first prediction area 421 may be predicted only based on the first prediction mode, and the second prediction area 422 may be predicted only based on the second prediction mode. In addition, the third prediction area 423 may be predicted based on the first prediction mode and the second prediction mode through the two blending matrices. Then, the decoder module 124 may further add a plurality of residual components into the prediction block to reconstruct the block unit. The residual components may be determined based on the bitstream. The decoder module 124 may reconstruct all of the other block units in the current frame for reconstructing the current frame and the video data.

Figure 6:
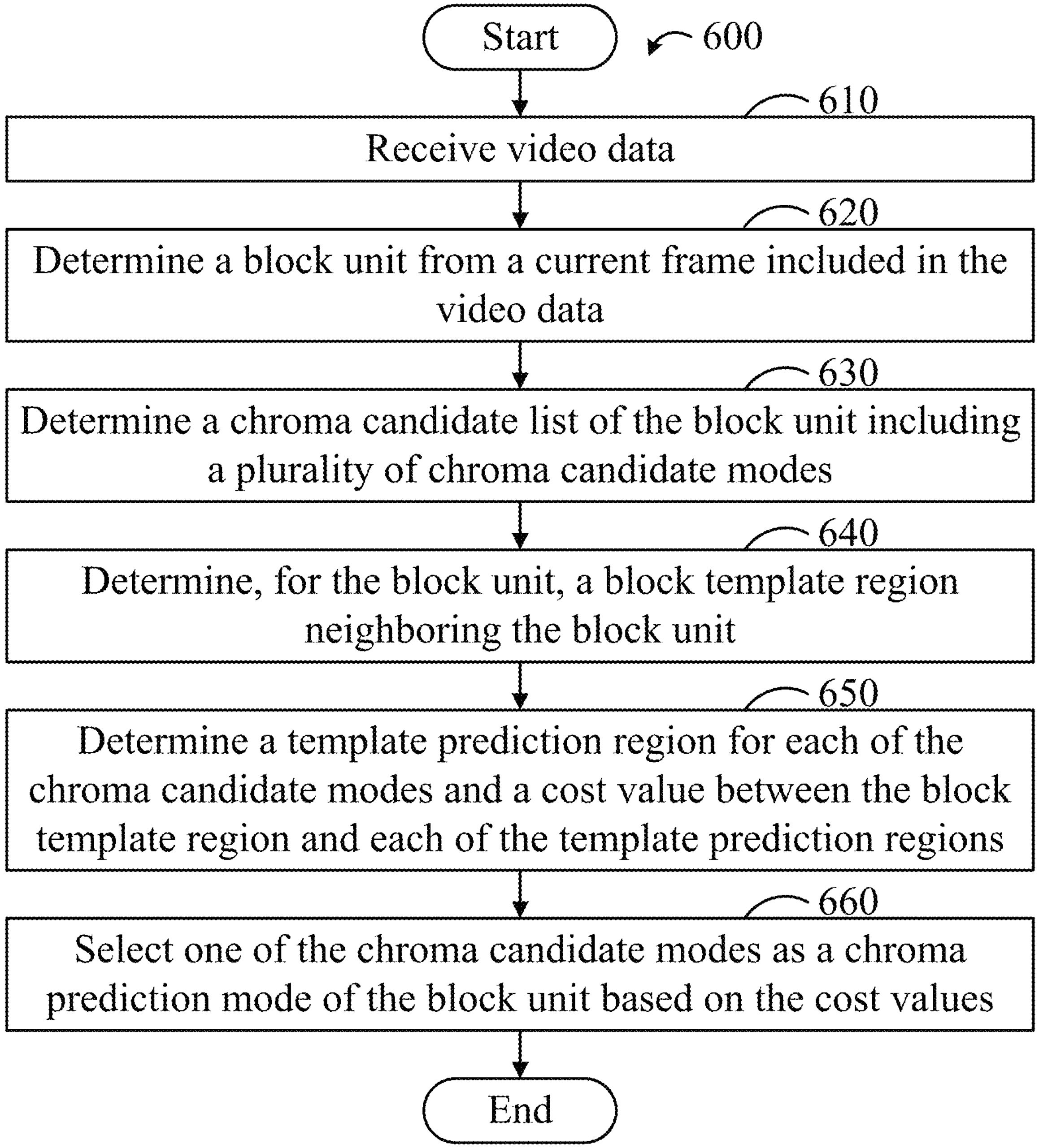
FIG. 6 illustrates a flowchart of a method for decoding and/or encoding video data by an electronic device, in accordance with one or more techniques of this disclosure.

FIG. 6 illustrates a flowchart of a method 600 for decoding and/or encoding video data by an electronic device, in accordance with one or more techniques of this disclosure. The method 600 is an example only, as there are a variety of ways of decoding the video data.

The method 600 may be performed using the configurations illustrated in FIGS. 1 and 2, and various elements of these figures are referenced with the description of the method 600. Each block illustrated in FIG. 6 may represent one or more processes, methods, or subroutines performed.

The order in which the blocks appear in FIG. 6 is for illustration only, and is not intended to limit the scope of the present disclosure, thus may change. Additional blocks may be added or fewer blocks may be utilized without departing from the present disclosure.

At block 610, the decoder module 124 receives video data. The video data received by the decoder module 124 may be a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 620, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine a plurality of coding units including a plurality of luma blocks and a plurality of chroma blocks according to the partition indications based on any video coding standard. The block unit may be one of the chroma blocks.

At block 630, the decoder module 124 determines a chroma candidate list of the block unit including a plurality of chroma candidate modes.

With reference to FIGS. 1 and 2, the decoder module 124 may determine that the chroma candidate modes in the chroma candidate list may be used to predict the block unit. Thus, the decoder module 124 may select one of the chroma candidate modes to predict the block unit.

In some implementations, each of the chroma candidate modes in the chroma candidate list of the block unit may be one of a plurality of linear model (LM) prediction modes and a plurality of chroma intra prediction modes. In some implementations, the chroma intra prediction modes may include a planar mode, a DC mode, a horizontal mode, a vertical mode, a chroma derived mode, and a decoder-side intra mode derivation chroma (DIMD_CHROMA) mode. The DIMD_CHROMA may be derived by calculating a histogram of gradient based on a plurality of chroma samples neighboring the block unit and a plurality of luma samples neighboring a corresponding luma block. In some implementations, the LM prediction modes may include a cross-component linear model (CCLM) prediction mode, a multi-directional linear model LM (MDLM_LM) prediction mode, an MDLM_L prediction mode, an MDLM_T prediction mode, a multi-mode linear model LM (MMLM_LM) prediction mode, an MMLM_L mode, an MMLM_T prediction mode, a convolutional cross-component model (CCCM) prediction, and a gradient linear model (GLM) prediction mode. In some implementations, a plurality of linear model parameters of a linear model in the LM prediction modes may be derived based on all of reference samples in a plurality of reference sample regions by using a least mean square (LMS) algorithm. The linear model parameters of the LM prediction modes generated by all of reference samples in the reference sample regions with LMS algorithm may be denoted as LM_LMS prediction mode. For example, if the linear model parameters of the MDLM_LM prediction mode are generated by all reference samples in the reference sample regions with LMS algorithm, the MDLM_LM mode may be represented as MDLM_LM_LMS mode. In some implementations, the LM prediction modes may include at least one of a CCLM prediction mode, a CCLM_LMS prediction mode, an MDLM_LM prediction mode, an MDLM_L prediction mode, an MDLM_T prediction mode, an MDLM_LM_LMS prediction mode, an MDLM_L_LMS prediction mode, an MDLM_T_LMS prediction mode, an MMLM_LM prediction mode, an MMLM_L mode, an MMLM_T prediction mode, an MMLM_LM_LMS prediction mode, an MMLM_L_LMS mode, an MMLM_T_LMS prediction mode, a CCCM prediction, a GLM prediction mode, and any other LM prediction modes.

In some implementations, each of the chroma candidate modes in the chroma candidate list of the block unit may be one of a plurality of chroma most probable modes (MPMs). In some implementations, the chroma MPMs in the chroma candidate list of the block unit may include at least one of a plurality of neighboring chroma modes or a plurality of corresponding luma modes. The plurality of neighboring chroma modes may be a plurality of chroma prediction modes of a plurality of neighboring chroma blocks neighboring the block unit. The neighboring blocks may include a block located above the block unit, a block located to a left side of the block unit, and a block located to a top-left side of the block unit. The corresponding luma modes may include a plurality of luma prediction modes of a plurality of luma blocks corresponding to the block unit. The number of the luma blocks corresponding to the block unit may be more than one since a partition of the luma blocks corresponding to the block unit may be different from that of the block unit.

In some implementations, each of the chroma candidate modes in the chroma candidate list of the block unit may be one of a plurality of first adjusted LM prediction modes. In some implementations, each of the first adjusted LM prediction modes may be generated by adjusting a corresponding one of the LM prediction modes by a corresponding one of adjustment parameters. Thus, the LM prediction modes may be adjusted by different adjustment parameters. In some implementations, the adjustment parameters may include a plurality of integers from −A to A, and may be used to adjust the linear models of the LM prediction modes. In some implementations, the adjustment parameters may include −4, −3, −2, −1, 0, 1, 2, 3, and 4, so the number A may be equal to 4. In some implementations, the number of the adjustment parameters may be equal to Na, and the number of the LM prediction modes Nm. Thus, the number of the first adjusted LM prediction modes may be equal to Nm×Na. In some implementations, the LM prediction modes may include at least one of a CCLM prediction mode, a CCLM_LMS prediction mode, an MDLM_LM prediction mode, an MDLM_L prediction mode, an MDLM_T prediction mode, an MDLM_LM_LMS prediction mode, an MDLM_L_LMS prediction mode, an MDLM_T_LMS prediction mode, an MMLM_LM prediction mode, an MMLM_L mode, an MMLM_T prediction mode, an MMLM_LM_LMS prediction mode, an MMLM_L_LMS mode, an MMLM_T_LMS prediction mode, and any other LM prediction modes.

In some implementations, the chroma candidate modes in the chroma candidate list of the block unit may be one of a plurality of second adjusted LM prediction modes. In some implementations, each of the second adjusted LM prediction modes may be generated by using a plurality of adjustment parameters to adjust a specific one of the LM prediction modes. In some implementation, the specific LM prediction mode may be determined based on a LM mode index included in the bitstream. Thus, the adjustment parameters may be used to adjust only one of the LM prediction modes. In some implementations, the adjustment parameters may include a plurality of integers from −A to A, and may be used to adjust the linear model of the specific LM prediction mode. In some implementations, the number of the adjustment parameters may be equal to Na, so the number of the second adjusted LM prediction modes may be equal to Na.

When the block unit is predicted by one of the LM prediction modes, the block unit may be predicted by using a corresponding down-sampled reconstructed luma block (e.g., $rec_L'(i, j)$), based on a linear model to generate a predicted block (e.g., $pred_C(i, j)$), as shown as follows:

$$pred_C(i,j) = \alpha \times rec'_L(i,j) + \beta$$

where α and β may be a plurality of linear model parameters. When the linear mode of the LM prediction mode is adjusted by one of the adjustment parameters, the linear model parameters of the LM prediction mode may be adjusted by that adjustment parameter. The linear model parameters may be modified based on the specific adjustment parameter as follows:

$$\alpha' = \alpha + u$$

$$\beta' = \beta - u \times y_r$$

where α' and β' may be the adjusted linear model parameters generated by adjusting the linear model parameters by the adjustment parameter, u may be the adjustment parameter, and $y_r$ may be an average of a plurality of reference luma samples.

Referring back to FIG. 6, at block 640, the decoder module 124 determines, for the block unit, a block template region neighboring the block unit.

Figure 7:
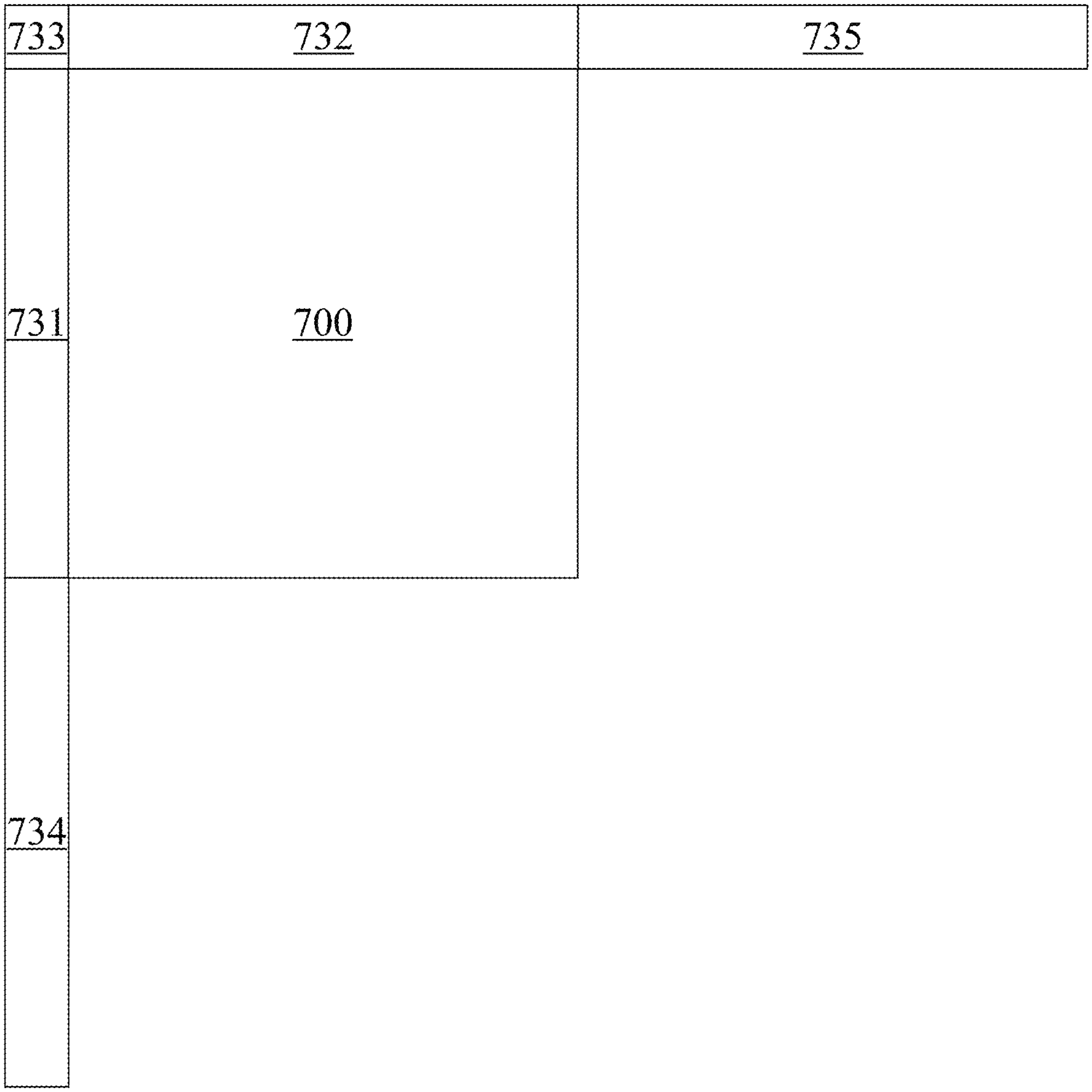
FIG. 7 illustrates an example implementation of a block unit and a plurality of adjacent regions, in accordance with one or more techniques of this disclosure.

With reference to FIGS. 1 and 2, the decoder module 124 may determine the block template region adjacent to the block unit from the current frame. FIG. 7 illustrates an example implementation of a block unit 700 and a plurality of adjacent regions 731, 732, 733, 734, and 735, in accordance with one or more techniques of this disclosure. A first adjacent region 731 may be a left adjacent region located to a left side of the block unit 700, a second adjacent region 732 may be an above adjacent region located above the block unit 700, a third adjacent region 733 may be an above-left adjacent region located to a top-left side of the block unit 700, a fourth adjacent region 734 may be a bottom-left adjacent region located to a bottom-left side of the block unit 700, and a fifth adjacent region 735 may be an above-right adjacent region located to an above-right side of the block unit 700. The adjacent regions 731-735 may be reconstructed prior to reconstructing the block unit 700.

A height of the left adjacent region 731 may be equal to a height H of the block unit 700, and a width of the left adjacent region 731 may be equal to a number S of the reconstructed samples of the first adjacent region 731 along a horizontal direction. A height of the above adjacent region 732 may be equal to a number R of the reconstructed samples of the second adjacent region 732 along a vertical direction, and a width of the above adjacent region 732 may be equal to a width W of the block unit 700. In addition, a height of the above-right adjacent region 733 may be equal to the number R of the reconstructed samples of the second adjacent region 732 along the vertical direction, and a width of the above-right adjacent region 735 may be equal to one of the width W and the height H of the block unit 700. A width of the bottom-left adjacent region 734 may be equal to the number S of the reconstructed samples of the first adjacent region 731 along the horizontal direction, and a height of the bottom-left adjacent region 734 may be equal to one of the width W and the height H of the block unit 700. In some implementation, the numbers, R and S, may be positive integers (e.g., 2). In addition, the numbers, R and S, may be equal to or different from each other. Furthermore, the numbers, R and S, may be greater than or equal to one. A height of the bottom-left adjacent region 734 may be equal to or greater than the height H of the block unit 700.

The decoder module 124 may use at least one of the adjacent regions 731-735 as the block template region to determine one of the chroma candidate modes for predicting the block unit 700. In some implementations, the decoder module 124 may use all of the adjacent regions 731-735 as the block template region to determine one of the chroma candidate modes for predicting the block unit 700. In some implementations, the decoder module 124 may use four of the adjacent regions 731-735 as the block template region to determine one of the chroma candidate modes for predicting the block unit 700. For example, the decoder module 124 may use the adjacent regions 731, 732, 734, and 735 as the block template region to determine one of the chroma candidate modes for predicting the block unit 700. In some implementations, the decoder module 124 may use three of the adjacent regions 731-735 as the block template region to determine one of the chroma candidate modes for predicting the block unit 700. For example, the decoder module 124 may use the adjacent regions 731-733 as the block template region to determine one of the chroma candidate modes for predicting the block unit 700. In some implementations, the decoder module 124 may use two of the adjacent regions 731-735 as the block template region to determine one of the chroma candidate modes for predicting the block unit 700. For example, the decoder module 124 may use the adjacent regions 731 and 734 as the block template region to determine one of the chroma candidate modes for predicting the block unit 700. In some implementations, the decoder module 124 may use only one of the adjacent regions 731-735 as the block template region to determine one of the chroma candidate modes for predicting the block unit 700. For example, the decoder module 124 may use the adjacent region 731 as the block template region to determine one of the chroma candidate modes for predicting the block unit 700.

In some implementations, the size of the block template region may be determined based on the size of the block unit 700. The height of the above adjacent region and the width of the left adjacent region may be determined by a comparison between the size of the block unit 700 and a size threshold. When the width W of the block unit 700 is less than or equal to the size threshold, the width of the left adjacent region may be equal to a first positive integer L1. When the width W of the block unit 700 is greater than the size threshold, the width of the left adjacent region may be equal to a second positive integer L2 greater than the first positive integer L1. For example, the size threshold may be equal to 8, the first positive integer L1 may be equal to 1, and the second positive integer L2 may be equal to 2. When the height H of the block unit 700 is less than or equal to the size threshold, the height of the above adjacent region may be equal to a third positive integer L3. In addition, when the height H of the block unit 700 is greater than the size threshold, the height of the above adjacent region may be equal to a fourth positive integer L4 greater than the third positive integer L3. For example, the size threshold may be equal to 8, the third positive integer L3 may be equal to 1, and the fourth positive integer L4 may be equal to 2.

Referring back to FIG. 6, at block 650, the decoder module 124 determines a template prediction region for each of the chroma candidate modes and a cost value between the block template region and each of the template prediction regions.

With reference to FIGS. 1 and 2, the decoder module 124 may predict the block template region based on the chroma candidate modes to generate the template prediction regions. In addition, the decoder module 124 may compare a plurality of chroma reconstructed template samples of the block template region and a plurality of chroma predicted template samples of one of the template prediction regions to determine the cost value between the block template region and the one of the template prediction regions.

Since the block template region is reconstructed prior to reconstructing the block unit 700, the decoder module 124 may directly receive a reconstructed result of the block template region. The reconstructed result of the block template region may include a chroma reconstructed result of the block template region having the chroma reconstructed template samples and a luma reconstructed result of the block template region having a plurality of luma reconstructed template samples. The plurality of chroma reconstructed template samples may be generated by reconstructing the neighboring chroma blocks, and the plurality of luma reconstructed template samples may be generated by reconstructing a plurality of neighboring luma blocks corresponding to the neighboring chroma blocks.

The luma reconstructed template samples may be further down-sampled to generate a plurality of luma down-sampled template samples. The luma down-sampled template samples may be derived by using a down-sampling filter. The luma down-sampled template samples corresponding to the chroma reconstructed template samples may be down-sampled based on a video format (e.g., 4:4:4, 4:2:2, and 4:2:0).

The decoder module 124 may predict the block template region based on the luma down-sampled template samples by using one of the chroma candidate modes to generate a corresponding one of the template prediction regions when the one of the chroma candidate modes is one of the LM prediction modes. The decoder module 124 may predict the block template region based on a chroma template reference line neighboring the block template region by using one of the chroma candidate modes to generate a corresponding one of the template prediction regions when the one of the chroma candidate modes is one of the chroma intra prediction modes. Each of the template prediction regions may include the chroma predicted template samples.

The decoder module 124 may determine a cost value between the chroma reconstructed result of the block template region and each of the template prediction regions. The decoder module 124 may derive the cost values between the chroma reconstructed result of the block template region and the template prediction regions by an intra template matching (TM). The intra TM may be calculated based on a difference between the chroma reconstructed result and each of the template prediction regions. The chroma reconstructed result may include the chroma reconstructed template samples of the block template region, and each of the template prediction regions may include the chroma predicted template samples for the block template region. Thus, the cost value for each of the template prediction regions is a TM cost value determined by comparing the chroma reconstructed template samples of the block template region with the chroma predicted template samples for a corresponding one of the template prediction regions.

The difference between the chroma reconstructed result and one of the template prediction regions may be calculated based on an MSE calculation. In addition, the difference between the chroma reconstructed result and one of the template prediction regions may be calculated based on an SAD calculation. In some implementations, the difference between the chroma reconstructed result and one of the template prediction regions may be calculated based on an SATD calculation. Each of the differences generated by calculating between the chroma reconstructed result and the template prediction regions may be regarded as a TM cost.

The template prediction regions each generated for the block template region based on a corresponding one of the chroma candidate modes may be compared with the chroma reconstructed result of the block template region for generating the cost values. Thus, the number of the chroma candidate modes may be both equal to the number of the template prediction regions and the number of the cost values. Thus, when the number of the chroma candidate modes is equal to M, the number of the cost values may be equal to M.

Referring back to FIG. 6, at block 660, the decoder module 124 selects one of the chroma candidate modes as a chroma prediction mode of the block unit based on the cost values.

With reference to FIGS. 1 and 2, in some implementations, the decoder module 124 may directly select the one of the chroma candidate modes as the chroma prediction mode of the block unit 700 based on the cost value without further parsing any other syntax or considering any other parameters. In some implementations, the decoder module 124 may determine an arrangement of the chroma candidate modes based on the cost values and select one of the chroma candidate modes as the chroma prediction mode of the block unit 700 based on the arrangement and a chroma mode index included in the bitstream.

The decoder module 124 may determine the chroma prediction mode from the chroma candidate modes based on the cost values of the template prediction regions. The decoder module 124 may determine the arrangement of the chroma candidate modes based on the cost values and reorder the chroma candidate modes based on the arrangement. In some implementations, the chroma candidate modes may be reordered in an ascending order or a descending order of the cost values. Before the arrangement is determined based on the cost values, the chroma candidate modes may be ordered based on arbitrary rules.

The chroma candidate modes may be reordered in the ascending order of the cost values. Thus, when the cost value of a specific one of the chroma candidate modes is less than the cost values of the other chroma candidate modes, the specific chroma candidate mode may be moved forward to be the first chroma candidate mode based on the arrangement. In other words, the specific chroma candidate mode may be moved to be the first chroma candidate mode when the cost value of the specific chroma candidate mode is the minimum of the cost values of the chroma candidate modes. In addition, the specific chroma candidate mode may be moved to be the last one of the chroma candidate modes when the cost value of the specific chroma candidate mode is the maximum of the cost values of the chroma candidate modes. For example, the chroma candidate modes may include six chroma candidate modes CM1, CM2, CM3, CM4, CM5, and CM6 having six cost values CV1, CV2, CV3, CV4, CV5, and CV6, respectively. When a value order of the six cost values is CV4>CV2>CV5>CV1>CV6>CV3, the arrangement of the chroma candidate modes may be changed from an original order of the six chroma candidate modes CM1, CM2, CM3, CM4, CM5, and CM6 to a new order of the six chroma candidate modes CM3, CM6, CM1, CM5, CM2, and CM4.

The arrangement may be further determined by adjusting the new order of the chroma candidate modes based on a diversity criterion. The decoder module 124 may determine a difference value between two of the cost values selected from two neighboring ones of the chroma candidate modes ordered in the new order. When the difference value is less than or equal to a diversity threshold, the last one of the two neighboring ones of the chroma candidate modes may be moved backward. For example, when the value order of the six cost values is CV4>CV2>CV5>CV1>CV6>CV3, and the difference between two of the cost values CV1 and CV6 is less than the diversity threshold, then the chroma candidate mode CM1 may be moved backward. Therefore, the arrangement of the chroma candidate modes may be further changed from the new order of the six chroma candidate modes CM3, CM6, CM1, CM5, CM2, and CM4 to another new (or final) order of the six chroma candidate modes CM3, CM6, CM5, CM1, CM2, and CM4. In some implementations, the arrangement may not be determined by adjusting the new order of the chroma candidate modes based on the diversity criterion, such that the arrangement may be identical to the new order of the chroma candidate modes.

The decoder module 124 may select K chroma candidate modes having the least cost values from the chroma candidate modes and add the selected chroma candidate modes into a chroma mode list. The number K, being a positive integer, may be equal to the number of the chroma candidate modes in the chroma mode list and less than the total number of the chroma candidate modes. In other words, the decoder module 124 may select the first to the K-th chroma candidate modes ordered based on the arrangement when the chroma candidate modes are reordered in the ascending order of the cost values to generate the arrangement. Each of the chroma candidate modes in the chroma mode list may have a chroma index value. Thus, the chroma index value for the chroma mode list may be within an index range of 0 to K−1 since the number of the chroma candidate modes in the chroma mode list is equal to K. In some implementations, a size of the chroma candidate list may be greater than a size of the chroma mode list. In other words, the number of chroma candidate modes in the chroma candidate list may be greater than the number of chroma candidate modes in the chroma mode list.

The decoder module 124 may determine the chroma prediction mode from the chroma candidate modes based on at least one of the arrangement or the chroma mode index of the block unit 700 determined based on the bitstream. In some implementations, a minimum one of the cost values may be determined, and then one of the chroma candidate modes corresponding to the minimum one of the cost values may be directly determined as the chroma prediction mode without parsing the chroma mode index. Thus, the number of bits in the bitstream may be reduced. In some implementations, the chroma mode index may be parsed for the block unit 700 for selecting the chroma prediction mode from the chroma candidate list arranged based on the arrangement. In some implementations, the chroma mode index may be parsed for the block unit 700 for selecting the chroma prediction mode from the chroma mode list. The chroma candidate mode having a lower cost value may have a lower chroma index value when the chroma candidate modes are reordered in the ascending order of the cost values. Thus, since the chroma candidate mode having a lower cost value may be more easily selected than the chroma candidate mode having a higher cost value, the number of bits in the bitstream may also be reduced.

In some implementations, a deltaActive flag may be decoded for the block unit from the bitstream to indicate whether the adjustment parameter is applied to the LM prediction mode of the block unit or not. In some implementations, since one of the adjustment parameters included in the chroma candidate modes may be equal to zero, the decoder module 124 may determine that the adjustment parameter is not applied to the LM prediction mode of the block unit when the selected chroma candidate mode including the adjustment parameter equal to zero is determined, by using the intra TM, as the chroma prediction mode of the block unit. Thus, when one of the adjustment parameters is equal to zero, the decoder module 124 may directly determine whether the adjustment parameter is applied to the LM prediction mode of the block unit without parsing the deltaActive flag, for the block unit, from the bitstream.

In some implementations, a sign flag may be decoded for the block unit from the bitstream to indicate whether an adjustment parameter of the block unit is a positive value or a negative value when the adjustment parameter is applied to the LM prediction mode of the block unit. In some implementations, the adjustment parameters included in the chroma candidate modes may include a plurality of positive integers and a plurality of negative integers. Thus, the decoder module 124 may directly determine, without parsing the sign flag for the block unit from the bitstream, that the adjustment parameter of the block unit is one of the positive integers when the selected chroma candidate mode including the adjustment parameter being the positive integer is determined, by using the intra TM, as the chroma prediction mode of the block unit. In addition, the decoder module 124 may directly determine, without parsing the sign flag for the block unit from the bitstream, that the adjustment parameter of the block unit is one of the negative integers when the selected chroma candidate mode including the adjustment parameter being the negative integer is determined, by using the intra TM as the chroma prediction mode of the block unit.

Since the corresponding luma block corresponding to the block unit 700 is generated prior to reconstructing the block unit 700, the decoder module 124 may directly receive a plurality of luma reconstructed samples of the corresponding luma block. The luma reconstructed samples of the corresponding luma block may be further down-sampled to generate a plurality of luma down-sampled samples of the corresponding luma block. The luma down-sampled samples of the corresponding luma block may be derived by using a down-sampling filter. The luma down-sampled samples of the corresponding luma block may be down-sampled based on a video format (e.g., 4:4:4, 4:2:2, and 4:2:0).

The decoder module 124 may predict the block unit 700 based on the luma down-sampled samples of the corresponding luma block by using the chroma prediction mode to generate a chroma prediction block when the chroma prediction mode is one of the LM prediction modes. The decoder module 124 may predict the block unit 700 based on a chroma reference line neighboring the block unit 700 by using the chroma prediction mode to generate the chroma prediction block when the chroma prediction mode is one of the chroma intra prediction modes. Then, the decoder module 124 may further add a plurality of residual components into the chroma prediction block to reconstruct the block unit 700. The residual components may be a plurality of chroma residual components determined based on the bitstream. The decoder module 124 may reconstruct all of the other block units in the current frame for reconstructing the current frame and the video data.

Figure 8:
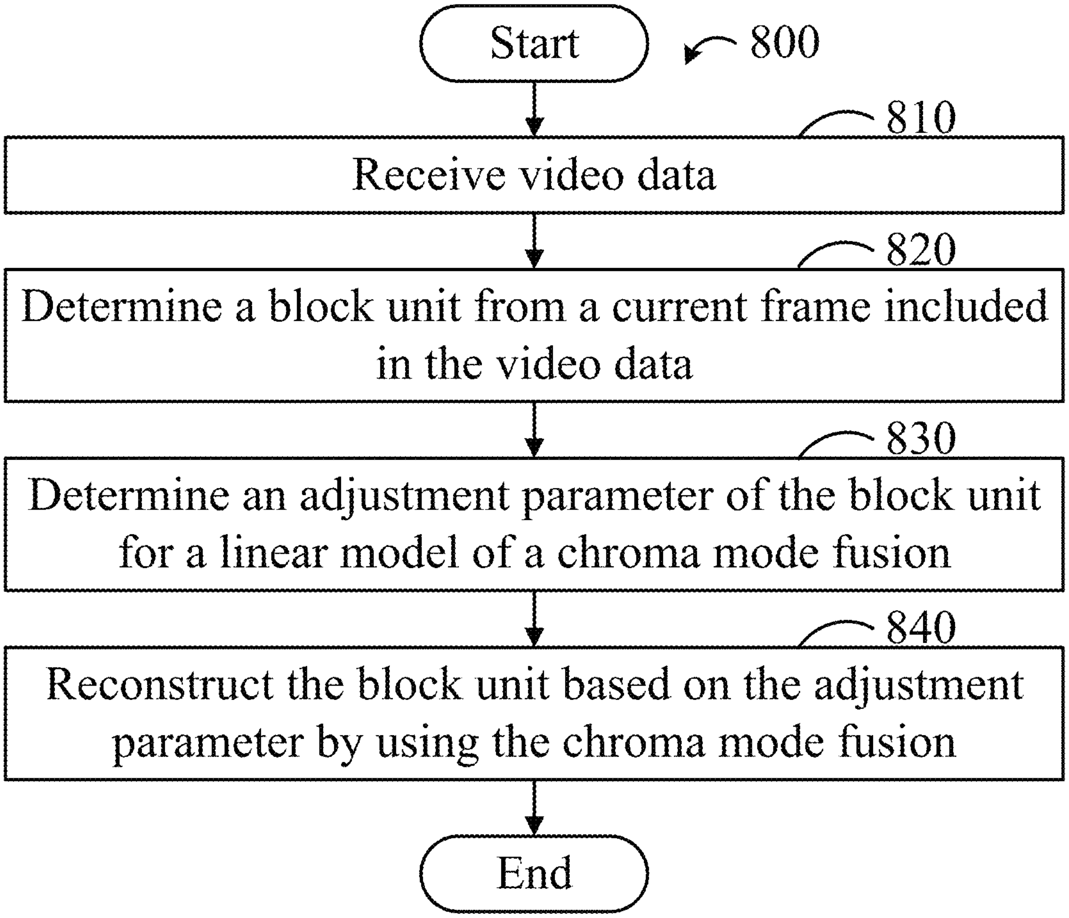
FIG. 8 illustrates a flowchart of a method for decoding and/or encoding video data by an electronic device, in accordance with one or more techniques of this disclosure.

FIG. 8 illustrates a flowchart of a method 800 for decoding and/or encoding video data by an electronic device, in accordance with one or more techniques of this disclosure. The method 800 is an example only, as there are a variety of ways of decoding the video data.

The method 800 may be performed using the configurations illustrated in FIGS. 1 and 2, and various elements of these figures are referenced with the description of the method 800. Each block illustrated in FIG. 8 may represent one or more processes, methods, or subroutines performed.

The order in which the blocks appear in FIG. 8 is for illustration only, and is not intended to limit the scope of the present disclosure, thus may change. Additional blocks may be added or fewer blocks may be utilized without departing from the present disclosure.

At block 810, the decoder module 124 receives video data. The video data received by the decoder module 124 may be a bitstream.

With reference to FIGS. 1 and 2, the second electronic device 120 may receive the bitstream from an encoder, such as the first electronic device 110 (or other video providers) via the second interface 126. The second interface 126 may provide the bitstream to the decoder module 124.

The bitstream may include a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 820, the decoder module 124 determines a block unit from a current frame included in the video data.

With reference to FIGS. 1 and 2, the decoder module 124 may determine the image frames included in the bitstream when the video data received by the decoder module 124 is the bitstream. The current frame may be one of the image frames determined according to the bitstream. The decoder module 124 may further divide the current frame to determine the block unit according to the partition indications in the bitstream. For example, the decoder module 124 may divide the current frame to generate a plurality of CTUs, and further divide one of the CTUs to determine a plurality of coding units including a plurality of luma blocks and a plurality of chroma blocks according to the partition indications based on any video coding standard. The block unit may be one of the chroma blocks.

At block 830, the decoder module 124 determines an adjustment parameter of the block unit for a linear model of a chroma mode fusion.

With reference to FIGS. 1 and 2, the decoder module 124 may determine the adjustment parameter by an adjustment index for the linear model of the chroma mode fusion. In some implementations, the decoder module 124 may determine the adjustment parameter by a template matching for the linear model of the chroma mode fusion.

In some implementations, the chroma mode fusion may include one of a plurality of LM prediction modes and one of a plurality of chroma intra prediction modes. In some implementations, the chroma intra prediction modes may include a planar mode, a DC mode, a horizontal mode, a vertical mode, a chroma derived mode, and a DIMD_CHROMA mode. In some implementations, the chroma intra prediction modes may further include a plurality of angular modes each having an intra mode index from 2 to 66. In some implementations, the chroma intra prediction modes may further include angular modes each having an intra mode index from 2 to 131. The DIMD_CHROMA may be derived by calculating a histogram of gradient based on a plurality of chroma samples neighboring the block unit and a plurality of luma samples neighboring a corresponding luma block. In some implementations, the LM prediction modes may include a CCLM prediction mode, an MDLM_LM prediction mode, an MDLM_L prediction mode, an MDLM_T prediction mode, an MMLM_LM prediction mode, an MMLM_L mode, an MMLM_T prediction mode, a CCCM prediction, and a GLM prediction mode.

In some implementations, a deltaActive flag may indicate whether the adjustment parameter is applied to the LM prediction mode of the chroma mode fusion or not. When the deltaActive flag is true for an MMLM mode series, a bothActive_first flag may indicate whether the adjustment parameter is applied to a first linear model in Cb component and Cr component of the chroma mode fusion or not. When the deltaActive flag is true for the MMLM mode series, a bothActive_second flag may indicate whether the adjustment parameter is applied to a second linear model in Cb component and Cr component of the chroma mode fusion or not. In some implementations, a syntax "is_cb0_flag" may indicate whether the adjustment parameter is applied to Cb component in the first linear model, a syntax "is_cr0_flag" may indicate whether the adjustment parameter is applied to Cr component in the first linear model, a syntax is_cb1_flag may indicate whether the adjustment parameter is applied to Cb component in the second linear model, a syntax "is_cr1_flag" may indicate whether the adjustment parameter is applied to Cr component in the second linear model. In some implementations, a syntax "sign_flag" may indicate a sign of the adjustment parameter and the adjustment parameter may be signaled in truncated unary.

In some implementations, the adjustment parameter may be determined from a plurality of candidate parameters including a plurality of integers from −A to A, and may be used to adjust the linear models of the LM prediction modes. In some implementations, the candidate parameters may include −4, −3, −2, −1, 0, 1, 2, 3, and 4, so the number A may be equal to 4.

In some implementations, the decoder module 124 may determine a block template region neighboring the block unit and generate a template prediction region for each of the candidate parameters. The decoder module 124 may further determine a cost value between the block template region and each of the template prediction regions for selecting the adjustment parameter.

Referring back to FIG. 8, at block 840, the decoder module 124 reconstructs the block unit based on the adjustment parameter by using the chroma mode fusion.

With reference to FIGS. 1 and 2, the decoder module 124 may predict the block unit based on the adjustment parameter by using the chroma mode fusion. The decoder module 124 may predict the block unit based on a chroma reference line neighboring the block unit by using the one of the chroma intra prediction modes to generate a first chroma prediction block. The decoder module 124 may predict the block unit based on a plurality of luma down-sampled samples of a corresponding luma block by using the one of the LM prediction modes with the adjustment parameter to generate a second chroma prediction block.

The chroma mode fusion may weightedly combine the first chroma prediction block and the second chroma prediction block as follows:

$$C_f = w_0 \times C_i + w_1 \times C_{lm}$$

$C_f$ may be a chroma prediction block of the block unit generated by using the chroma mode fusion. $w_0$ may be a first weighting parameter for the one of the chroma intra prediction modes and $w_1$ may be a second weighting parameter of the one of the LM prediction modes. $C_i$ may be the first chroma prediction block generated by using the one of the chroma intra prediction modes and $C_{lm}$ may be the second chroma prediction block generated by using the one of the LM prediction modes.

In some implementations, the first and the second weighting parameters may be determined based on a plurality of neighboring blocks neighboring the block unit. In some implementations, when a chroma prediction mode of a neighboring block located above the block unit is identical to one of the LM prediction modes, and a chroma prediction mode of a neighboring block located to a left side of the block unit is identical to one of the LM prediction modes, then the second weighting parameter $w_1$ for the LM prediction modes may be equal to 3, and the first weighting parameter $w_0$ for the chroma intra prediction modes may be equal to 1.

In some implementations, when the chroma prediction mode of the neighboring block located above the block unit is different from the LM prediction modes, and the chroma prediction mode of the neighboring block located to the left side of the block unit is different from the LM prediction modes, then the second weighting parameter $w_1$ for the LM prediction modes may be equal to 1, and the first weighting parameter $w_0$ for the chroma intra prediction modes may be equal to 3.

In some implementations, when the chroma prediction mode of the neighboring block located above the block unit is identical to one of the LM prediction modes, and the chroma prediction mode of the neighboring block located to the left side of the block unit is different from the LM prediction modes, then both the second weighting parameter $w_1$ and the first weighting parameter $w_0$ may be equal to 2. In some implementations, when the chroma prediction mode of the neighboring block located above the block unit is different from the LM prediction modes, and the chroma prediction mode of the neighboring block located to the left side of the block unit is identical to one of the LM prediction modes, then both the second weighting parameter $w_1$ and the first weighting parameter $w_0$ may be equal to 2.

The decoder module 124 may further add a plurality of residual components into the chroma prediction block to reconstruct the block unit. The residual components may be determined based on the bitstream. The decoder module 124 may reconstruct all of the other block units in the current frame for reconstructing the current frame and the video data.

Figure 9:
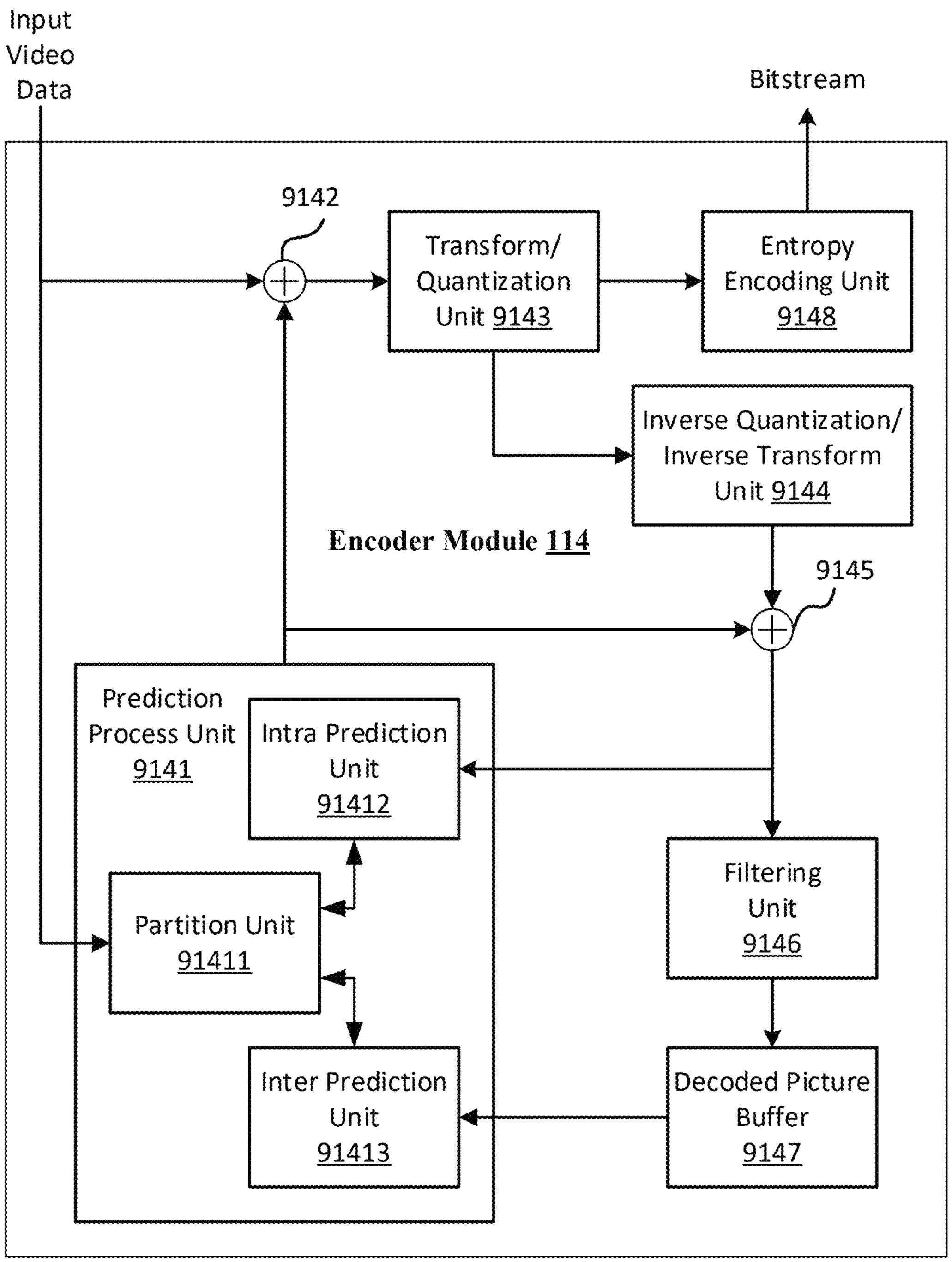
FIG. 9 illustrates a block diagram of an encoder module of the first electronic device illustrated in FIG. 1, in accordance with one or more techniques of this disclosure.

FIG. 9 illustrates a block diagram of the encoder module 114 of the first electronic device 110 illustrated in FIG. 1, in accordance with one or more techniques of this disclosure. The encoder module 114 may include a prediction processor (e.g., a prediction process unit 9141), at least a first summer (e.g., a first summer 9142) and a second summer (e.g., a second summer 9145), a transform/quantization processor (e.g., a transform/quantization unit 9143), an inverse quantization/inverse transform processor (e.g., an inverse quantization/inverse transform unit 9144), a filter (e.g., a filtering unit 9146), a decoded picture buffer (e.g., a decoded picture buffer 9147), and an entropy encoder (e.g., an entropy encoding unit 9148). The prediction process unit 9141 of the encoder module 114 may further include a partition processor (e.g., a partition unit 91411), an intra prediction processor (e.g., an intra prediction unit 91412), and an inter prediction processor (e.g., an inter prediction unit 91413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, CTUs, CBs, sub-divisions thereof, and/or another equivalent coding unit.

The encoder module 114 may perform additional sub-divisions of the source video. It should be noted that the disclosed implementations are generally applicable to video coding regardless of how the source video is partitioned prior to and/or during the encoding.

During the encoding process, the prediction process unit 9141 may receive a current image block of a specific one of the image frames. The current image block may be the luminance block or one of the chrominance blocks in the specific image frame.

The partition unit 91411 may divide the current image block into multiple block units. The intra prediction unit 91412 may perform intra-predictive coding of a current block unit relative to one or more neighboring blocks in the same frame as the current block unit in order to provide spatial prediction. The inter prediction unit 91413 may perform inter-predictive coding of the current block unit relative to one or more blocks in one or more reference image blocks to provide temporal prediction.

The prediction process unit 9141 may select one of the coding results generated by the intra prediction unit 91412 and the inter prediction unit 91413 based on a mode selection method, such as a cost function. The mode selection method may be a rate-distortion optimization (RDO) process.

The prediction process unit 9141 may determine the selected coding result and provide a predicted block corresponding to the selected coding result to the first summer 9142 for generating a residual block and to the second summer 9145 for reconstructing the encoded block unit. The prediction process unit 9141 may further provide syntax elements, such as motion vectors, intra mode indicators, partition information, and other syntax information, to the entropy encoding unit 9148.

The intra prediction unit 91412 may intra predict the current block unit. The intra prediction unit 91412 may determine an intra prediction mode directed toward a reconstructed sample neighboring the current block unit in order to encode the current block unit.

The intra prediction unit 91412 may encode the current block unit using various intra prediction modes. The intra prediction unit 91412 of the prediction process unit 9141 may select an appropriate intra prediction mode from the selected modes. The intra prediction unit 91412 may encode the current block unit using a cross component prediction mode to predict one of the two chroma components of the current block unit based on the luma components of the current block unit. The intra prediction unit 91412 may predict a first one of the two chroma components of the current block unit based on the second of the two chroma components of the current block unit.

The inter prediction unit 91413 may inter predict the current block unit as an alternative to the intra prediction performed by the intra prediction unit 91412. The inter prediction unit 91413 may perform motion estimation to estimate motion of the current block unit for generating a motion vector.

The motion vector may indicate a displacement of the current block unit within the current image block relative to a reference block unit within a reference image block. The inter prediction unit 91413 may receive at least one reference image block stored in the decoded picture buffer 9147 and estimate the motion based on the received reference image blocks to generate the motion vector.

The first summer 9142 may generate the residual block by subtracting the prediction block determined by the prediction process unit 9141 from the original current block unit. The first summer 9142 may represent the component or components that perform this subtraction.

The transform/quantization unit 9143 may apply a transform to the residual block in order to generate a residual transform coefficient and then quantize the residual transform coefficients to further reduce bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 9143 may perform a scan of the matrix including the quantized transform coefficients. Alternatively, the entropy encoding unit 9148 may perform the scan.

The entropy encoding unit 9148 may receive a plurality of syntax elements from the prediction process unit 9141 and the transform/quantization unit 9143, including a quantization parameter, transform data, motion vectors, intra modes, partition information, and other syntax information. The entropy encoding unit 9148 may encode the syntax elements into the bitstream.

The entropy encoding unit 9148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 in FIG. 1) or archived for later transmission or retrieval.

The inverse quantization/inverse transform unit 9144 may apply inverse quantization and inverse transformation to reconstruct the residual block in the pixel domain for later use as a reference block. The second summer 9145 may add the reconstructed residual block to the prediction block provided from the prediction process unit 9141 in order to produce a reconstructed block for storage in the decoded picture buffer 9147.

The filtering unit 9146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 9145.

The decoded picture buffer 9147 may be a reference picture memory that stores the reference block for use by the encoder module 914 to encode video, such as in intra or inter coding modes. The decoded picture buffer 9147 may include a variety of memory devices, such as DRAM (e.g., including SDRAM), MRAM, RRAM, or other types of memory devices. The decoded picture buffer 9147 may be on-chip with other components of the encoder module 114 or off-chip relative to those components.

The method 300 for decoding and/or encoding video data may be performed by the first electronic device 110. With reference to FIGS. 1, 3, and 9, at block 310, the encoder module 114 may receive the video data. The video data received by the encoder module 114 may be a video. At block 320, the encoder module 114 may determine a block unit from a current frame included in the video data. The encoder module 114 may divide the current frame to generate a plurality of CTUs, and further divide one of the CTUs to determine the block unit according to the partition indications based on any video coding standard.

With reference to FIGS. 1, 3, and 9, at block 330, the encoder module 114 may determine, from a plurality of candidate lines, a partitioning line for dividing the block unit into a pair of geometric partitions by using a GPM. In addition, at block 340, the encoder module 114 may determine two different prediction modes of the block unit from a plurality of candidate modes to generate two predicted blocks for the pair of the geometric partitions. In some implementations, the encoder module 114 may simultaneously determine the partitioning line and the two different prediction modes for dividing the block unit into the pair of geometric partitions to generate the two predicted blocks by using the GPM.

In some implementations, the encoder module 114 may generate a plurality of coding results generated by using a plurality of coding prediction modes including a plurality of GPM prediction modes. In some implementations, the coding prediction modes may include a plurality of intra prediction modes, a plurality of inter prediction modes, and a plurality of combined inter and intra prediction (CIIP) modes. In some implementations, each of the GPM prediction modes may have a predefined width, one of a plurality of candidate lines, and one of a plurality of mode combinations including at least two of a plurality of GPM candidate modes. In some implementations, the GPM candidate modes of the GPM prediction modes may be selected from an intra candidate list and a merge candidate list. The intra candidate list may include a plurality of intra candidate modes (e.g., a planar mode, a parallel mode, and a perpendicular mode) selected from a plurality of intra predefined modes. In some implementations, a direction of the parallel mode may be parallel to the partitioning line, and a direction of the perpendicular mode may be perpendicular to the partitioning line. In some implementations, the merge candidate list may include a plurality of merge candidate modes. In some implementations, the intra candidate list may be an MPM list. The MPM list may include at least one of a plurality of primary MPMs or a plurality of secondary MPMs in VVC or ECM. The MPM list may include a plurality of MPMs in a spatial GPM of ECM.

The encoder module 114 may traverse the coding prediction modes of the block unit and select one of the coding results based on a mode selection method, such as a cost function. The cost function may include an RDO, an SAD, an SATD, a Mean Absolute Difference (MAD), a Mean Squared Difference (MSD), and a Structural SIMilarity (SSIM). It should be noted that any cost function may be used without departing from this disclosure. When an initial prediction mode corresponding to the selected one of the coding results is one of the GPM prediction modes with two of the GPM candidate modes and a specific one of the candidate lines, the specific candidate line and the two of the GPM candidate modes may be determined as the partitioning line and the two different prediction modes.

With reference to FIGS. 1, 3, and 9, at block 350, the encoder module 114 may determine a blending width of the partitioning line from a plurality of candidate widths based on a block size of the block unit. In some implementations, the predefined width at blocks 330 and 340 may be identical to one of the candidate widths. The encoder module 114 and the decoder module 124 may use the same process to determine the blending width.

With reference to FIGS. 1, 3, and 9, at block 360, the encoder module 114 may weightedly combine the two predicted blocks along the partitioning line based on the blending width to reconstruct the block unit. The encoder module 114 and the decoder module 124 may use the same process to reconstruct the block unit. In some implementations, the encoder module 114 may further predict the block unit based on the partitioning line, the two different prediction modes, and the blending width to determine a plurality of predicted components of the block unit, and then determine a plurality of residual components by comparing a plurality of color components in the block unit with the predicted components. The encoder module 114 may further reconstruct the block unit based on the residual components and the predicted components to generate a plurality of reference samples for a plurality of following blocks that are predicted after predicting the block unit. In addition, the residual components may be encoded into the bitstream by the encoder module 114 for providing to the decoder module 124.

In some implementations, the encoder module 114 may signal a partition index indicating the partitioning line of the block unit and a first and a second prediction indices indicating the two different prediction modes into the bitstream. In some implementations, the encoder module 114 may signal a GPM set index for simultaneously selecting the partitioning line and the two different prediction modes.

The method 600 for decoding/encoding video data in FIG. 6 may be performed by the first electronic device 110. With reference to FIGS. 1, 6, and 9, at block 610, the encoder module 114 may receive the video data. The video data received by the encoder module 114 may be a video. At block 620, the encoder module 114 may determine a block unit from a current frame included in the video data. The encoder module 114 may divide the current frame to generate a plurality of CTUs, and further divide one of the CTUs to determine a plurality of coding units including a plurality of luma blocks and a plurality of chroma blocks according to the partition indications based on any video coding standard. The block unit may be one of the chroma blocks.

With reference to FIGS. 1, 6, and 9, at block 630, the encoder module 114 may determine a chroma candidate list of the block unit including a plurality of chroma candidate modes. In some implementations, the encoder module 114 may determine that the chroma candidate modes in the chroma candidate list may be used to predict the block unit. Thus, the encoder module 114 may select one of the chroma candidate modes to predict the block unit.

In some implementations, each of the chroma candidate modes in the chroma candidate list of the block unit may be one of a plurality of LM prediction modes or a plurality of chroma intra prediction modes. In some implementations, the chroma intra prediction modes may include a planar mode, a DC mode, a horizontal mode, a vertical mode, a chroma derived mode, and a DIMD_CHROMA mode. In some implementations, the LM prediction modes may include at least one of a CCLM prediction mode, a CCLM_LMS prediction mode, an MDLM_LM prediction mode, an MDLM_L prediction mode, an MDLM_T prediction mode, an MDLM_LM_LMS prediction mode, an MDLM_L_LMS prediction mode, an MDLM_T_LMS prediction mode, an MMLM_LM prediction mode, an MMLM_L mode, an MMLM_T prediction mode, an MMLM_LM_LMS prediction mode, an MMLM_L_LMS mode, an MMLM_T_LMS prediction mode, a CCCM prediction, a GLM prediction mode, or any other LM prediction modes. In some implementations, each of the chroma candidate modes in the chroma candidate list of the block unit may be a plurality of chroma MPMs. In some implementations, the chroma MPMs of the block unit may include at least one of a plurality of neighboring chroma modes or a plurality of corresponding luma modes.

In some implementations, each of the chroma candidate modes in the chroma candidate list of the block unit may be one of a plurality of first adjusted LM prediction modes. In some implementations, each of the first adjusted LM prediction modes may be generated by adjusting a corresponding one of the LM prediction modes by a corresponding one of adjustment parameters. In some implementations, the adjustment parameters may include a plurality of integers from −A to A, and may be used to adjust the linear models of the LM prediction modes. In some implementations, the adjustment parameters may include −4, −3, −2, −1, 0, 1, 2, 3, and 4, so the number A may be equal to 4. In some implementations, the number of the adjustment parameters may be equal to Na, and the number of the LM prediction modes Nm. Thus, the number of the first adjusted LM prediction modes may be equal to Nm×Na.

In some implementations, the encoder module 114 may traverse a plurality of chroma coding prediction modes of the block unit including a plurality of LM prediction modes and select one of the coding results based on a mode selection method, such as a cost function. In some implementations, the chroma coding prediction modes may include a plurality of chroma intra prediction modes, and a plurality of chroma inter prediction modes. The chroma intra prediction modes may include at least one of a plurality of chroma intra candidate modes or a plurality of LM prediction modes. In some implementation, the chroma intra candidate modes (e.g., a planar mode, a DC mode, and a chroma Derived mode (DM)) may be selected from a plurality of intra predefined modes. The encoder module 114 may traverse the coding prediction modes of the block unit and select one of the coding results based on a mode selection method, such as a cost function. The cost function may include an RDO, an SAD, an SATD, an MAD, an MSD, and an SSIM. It should be noted that any cost function may be used without departing from this disclosure. When a chroma initial mode corresponding to the selected one of the coding results is a specific one of the LM prediction modes, each of the chroma candidate modes in the chroma candidate list of the block unit may be generated by adjusting the specific LM prediction mode based on the adjustment parameters. In some implementation, a LM mode index may be signaled in the bitstream for indicating the specific LM prediction mode. In some implementations, the adjustment parameters may include a plurality of integers from −A to A, and may be used to adjust the linear models of the specific LM prediction mode. In some implementations, the number of the adjustment parameters may be equal to Na, so the number of the chroma candidate modes may be equal to Na.

With reference to FIGS. 1, 6, and 9, at block 640, the encoder module 114 may determine, for the block unit, a block template region neighboring the block unit. In FIG. 7, The encoder module 114 may use at least one of the adjacent regions 731-735 as the block template region for predicting the block unit 700. The encoder module 114 and the decoder module 124 may use the same process to determine the block template region.

With reference to FIGS. 1, 6, and 9, at block 650, the encoder module 114 may determine a template prediction region for each of the chroma candidate modes and a cost value between the block template region and each of the template prediction regions. In addition, at block 660, the encoder module 114 may select one of the chroma candidate modes as a chroma prediction mode of the block unit based on the cost values. In the implementations, the encoder module 114 and the decoder module 124 may use the same process to determine the template prediction regions and the cost values of the chroma candidate modes and to select the chroma prediction mode of the block unit based on the cost values. The encoder module 114 may predict the block unit based on the chroma prediction mode to determine a plurality of predicted components, and then determine a plurality of residual components by comparing a plurality of color components in the block unit with the predicted components. The encoder module 114 may further reconstruct the block unit based on the residual components and the predicted components to generate a plurality of reference samples for a plurality of following blocks that are predicted after predicting the block unit. In addition, the residual components may be encoded into the bitstream by the encoder module 114 to be provided to the decoder module 124.

In some implementations, when one of the adjustment parameters in the chroma candidate modes is equal to zero, the encoder module 114 may not signal a deltaActive flag of the block unit, into the bitstream, for indicating whether the adjustment parameter is applied to the LM prediction mode of the block unit or not. In some implementations, when the adjustment parameters included in the chroma candidate modes may include a plurality of positive integers and a plurality of negative integers, the encoder module 114 may not signal a sign flag of the block unit, into the bitstream, for indicating whether the adjustment parameter of the block unit is positive or negative.

The method 800 for decoding/encoding video data in FIG. 8 may be performed by the first electronic device 110. With reference to FIGS. 1, 8, and 9, at block 810, the encoder module 114 may receive the video data. The video data received by the encoder module 114 may be a video. At block 820, the encoder module 114 may determine a block unit from a current frame included in the video data. The encoder module 114 may divide the current frame to generate a plurality of CTUs, and further divide one of the CTUs to determine a plurality of coding units including a plurality of luma blocks and a plurality of chroma blocks according to the partition indications based on any video coding standard. The block unit may be one of the chroma blocks.

With reference to FIGS. 1, 8, and 9, at block 830, the encoder module 114 may determine an adjustment parameter of the block unit for a linear model of a chroma mode fusion. In some implementations, the adjustment parameter may be selected from a plurality of candidate parameters. The encoder module 114 may generate a plurality of coding results generated by using a plurality of chroma candidate modes including a plurality of chroma mode fusion modes with a plurality of candidate parameters. Then, the encoder module 114 may select one of the coding results based on a mode selection method, such as a cost function. The cost function may include an RDO, an SAD, an SATD, an MAD, an MSD, and an SSIM. It should be noted that any cost function may be used without departing from this disclosure. When a chroma prediction mode corresponding to the selected one of the coding results is the chroma mode fusion with a specific one of the candidate parameters, the specific candidate parameter may be directly determined as the adjustment parameter.

In some implementations, the encoder module 114 may generate a plurality of coding results generated by using a plurality of chroma candidate modes including the chroma mode fusion without the adjustment parameter. Then, the encoder module 114 may select one of the coding results based on the mode selection method. When a chroma prediction mode corresponding to the selected one of the coding results is the chroma mode fusion, the encoder module 114 may further determine a block template region neighboring the block unit and generate a template prediction region for each of the candidate parameters. The decoder module 124 may further determine a cost value between the block template region and each of the template prediction regions for selecting the adjustment parameter.

With reference to FIGS. 1, 8, and 9, at block 840, the encoder module 114 may reconstruct the block unit based on the adjustment parameter by using the chroma mode fusion. The encoder module 114 may predict the block unit based on the chroma mode fusion and the adjustment parameter to determine a plurality of predicted components, and then determine a plurality of residual components by comparing a plurality of color components in the block unit with the predicted components. The encoder module 114 may further reconstruct the block unit based on the residual components and the predicted components to generate a plurality of reference samples for a plurality of following blocks that are predicted after predicting the block unit. In addition, the residual components may be encoded into the bitstream by the encoder module 114 to be provided to the decoder module 124.

Therefore, the encoder module 114 may also use the methods 300, 600, and 800 to predict and reconstruct the block unit for encoding the video data into the bitstream. Since the encoder module 114 and the decoder module 124 may use at least one of the same method 300, or the same method 600, the encoder module 114 and the decoder module 124 may generate the same reordered list for decreasing the number of bits in the bitstream. In addition, the encoder module 114 may use the method 800 to more accurately predict the block unit to decrease the residual components for increasing the coding efficiency.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A non-transitory machine-readable medium of an electronic device storing one or more computer-executable instructions for decoding video data, the one or more computer-executable instructions, when executed by at least one processor of the electronic device, causing the electronic device to:

receive the video data;

determine a block unit from a current frame included in the video data;

determine a chroma candidate list of the block unit, the chroma candidate list including a plurality of chroma candidate modes, wherein:

each of the plurality of chroma candidate modes in the chroma candidate list of the block unit includes either a plurality of linear model (LM) prediction modes or a plurality of chroma intra prediction modes, and the plurality of chroma intra prediction modes includes a planar mode, a DC mode, a horizontal mode, a vertical mode, a chroma derived mode, and a decoder-side intra mode derivation chroma (DIMD_CHROMA) mode;

determine, for the block unit, a block template region neighboring the block unit;

determine a plurality of template prediction regions, wherein each template prediction region is associated with one of the plurality of chroma candidate modes and a plurality of cost values, wherein each cost value of the plurality of cost values is between the block template region and one of the plurality of template prediction regions;

select one of the plurality of chroma candidate modes, as a chroma prediction mode of the block unit, based on the plurality of cost values; and reconstruct the block unit by using the chroma prediction mode of the block unit.

2. The non-transitory machine-readable medium of claim 1, wherein the one or more computer-executable instructions, when executed by the at least one processor of the electronic device, further cause the electronic device to:

determine an arrangement of the plurality of chroma candidate modes based on the plurality of cost values; and determine a chroma mode list based on the arrangement, wherein selecting the one of the plurality of chroma candidate modes, as the chroma prediction mode of the block unit, based on the plurality of cost values further comprises selecting the one of the plurality of chroma candidate modes from the chroma mode list.

3. The non-transitory machine-readable medium of claim 2, wherein the arrangement is generated by ordering the plurality of chroma candidate modes in an ascending order of the plurality of cost values.

4. The non-transitory machine-readable medium of claim 2, wherein:

the chroma mode list comprises first K chroma candidate modes of the plurality of chroma candidate modes ordered based on the arrangement, where K is a positive integer less than a number of the plurality of chroma candidate modes in the chroma candidate list.

5. The non-transitory machine-readable medium of claim 1, wherein:

the plurality of chroma intra prediction modes further includes a plurality of neighboring chroma modes and a plurality of corresponding luma modes, the plurality of neighboring chroma modes includes a plurality of chroma prediction modes of a plurality of neighboring chroma blocks neighboring the block unit, and the plurality of corresponding luma modes includes a plurality of luma prediction modes of a plurality of luma blocks corresponding to the block unit.

6. The non-transitory machine-readable medium of claim 1, wherein the one or more computer-executable instructions, when executed by the at least one processor of the electronic device, further cause the electronic device to:

predict the block template region by using the plurality of chroma candidate modes to determine the plurality of template prediction regions, wherein:

the block template region includes a plurality of chroma reconstructed template samples, each of the plurality of template prediction regions includes a plurality of chroma predicted template samples for each of the plurality of chroma candidate modes, and each of the plurality of cost values is determined by comparing the plurality of chroma reconstructed template samples of the block template region against the plurality of chroma predicted template samples for each of the plurality of chroma candidate modes.

7. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame included in the video data;

determine a chroma candidate list of the block unit, the chroma candidate list including a plurality of chroma candidate modes, wherein:

each of the plurality of chroma candidate modes in the chroma candidate list of the block unit includes either a plurality of linear model (LM) prediction modes or a plurality of chroma intra prediction modes, and the plurality of chroma intra prediction modes includes a planar mode, a DC mode, a horizontal mode, a vertical mode, a chroma derived mode, and a decoder-side intra mode derivation chroma (DIMD_CHROMA) mode;

determine, for the block unit, a block template region neighboring the block unit;

determine a plurality of template prediction regions, wherein each template prediction region is associated with one of the plurality of chroma candidate modes and a plurality of cost values, wherein each cost value of the plurality of cost values is between the block template region one of the plurality of template prediction regions;

select one of the plurality of chroma candidate modes, as a chroma prediction mode of the block unit, based on the plurality of cost values; and reconstruct the block unit by using the chroma prediction mode of the block unit.

8. The electronic device of claim 7, wherein the one or more computer-executable instructions, when executed by the at least one processor, further cause the electronic device to:

determine an arrangement of the plurality of chroma candidate modes based on the plurality of cost values; and determine a chroma mode list based on the arrangement, wherein selecting the one of the plurality of chroma candidate modes, as the chroma prediction mode of the block unit, based on the plurality of cost values further comprises selecting the one of the plurality of chroma candidate modes from the chroma mode list.

9. The electronic device of claim 8, wherein the arrangement is generated by ordering the plurality of chroma candidate modes in an ascending order of the plurality of cost values.

10. The electronic device of claim 8, wherein:

the chroma mode list comprises first K chroma candidate modes of the plurality of chroma candidate modes ordered based on the arrangement, where K is a positive integer less than a number of the plurality of chroma candidate modes in the chroma candidate list.

11. The electronic device of claim 7, wherein:

the plurality of chroma intra prediction modes further includes a plurality of neighboring chroma modes and a plurality of corresponding luma modes, the plurality of neighboring chroma modes includes a plurality of chroma prediction modes of a plurality of neighboring chroma blocks neighboring the block unit, and the plurality of corresponding luma modes includes a plurality of luma prediction modes of a plurality of luma blocks corresponding to the block unit.

12. The electronic device of claim 7, wherein the one or more computer-executable instructions, when executed by the at least one processor, further cause the electronic device to:

predict the block template region by using the plurality of chroma candidate modes to determine the plurality of template prediction regions, wherein:

the block template region includes a plurality of chroma reconstructed template samples, each of the plurality of template prediction regions includes a plurality of chroma predicted template samples for each of the plurality of chroma candidate modes, and each of the plurality of cost values is determined by comparing the plurality of chroma reconstructed template samples of the block template region against the plurality of chroma predicted template samples for each of the plurality of chroma candidate modes.

13. An electronic device for encoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame included in the video data;

determine a chroma candidate list of the block unit, the chroma candidate list including a plurality of chroma candidate modes, wherein:

each of the plurality of chroma candidate modes in the chroma candidate list of the block unit includes either a plurality of linear model (LM) prediction modes or a plurality of chroma intra prediction modes, and the plurality of chroma intra prediction modes includes a planar mode, a DC mode, a horizontal mode, a vertical mode, a chroma derived mode, and a decoder-side intra mode derivation chroma (DIMD_CHROMA) mode;

determine, for the block unit, a block template region neighboring the block unit;

determine a plurality of template prediction regions, wherein each template prediction region is associated with one of the plurality of chroma candidate modes and a plurality of cost values, wherein each cost value is between the block template region and each of the plurality of template prediction regions;

select one of the plurality of chroma candidate modes, as a chroma prediction mode of the block unit, based on the plurality of cost values; and reconstruct the block unit by using the chroma prediction mode of the block unit.

14. The electronic device of claim 13, wherein the one or more computer-executable instructions, when executed by the at least one processor, further cause the electronic device to:

determine an arrangement of the plurality of chroma candidate modes based on the plurality of cost values; and determine a chroma mode list based on the arrangement, wherein selecting the one of the plurality of chroma candidate modes, as the chroma prediction mode of the block unit, based on the plurality of cost values further comprises selecting the one of the plurality of chroma candidate modes from the chroma mode list.

15. The electronic device of claim 14, wherein the arrangement is generated by ordering the plurality of chroma candidate modes in an ascending order of the plurality of cost values.

16. The electronic device of claim 14, wherein:

the chroma mode list comprises first K chroma candidate modes of the plurality of chroma candidate modes ordered based on the arrangement, where K is a positive integer less than a number of the plurality of chroma candidate modes in the chroma candidate list.

17. The electronic device of claim 13, wherein:

the plurality of chroma intra prediction modes further includes a plurality of neighboring chroma modes and a plurality of corresponding luma modes, the plurality of neighboring chroma modes includes a plurality of chroma prediction modes of a plurality of neighboring chroma blocks neighboring the block unit, and the plurality of corresponding luma modes includes a plurality of luma prediction modes of a plurality of luma blocks corresponding to the block unit.

18. The electronic device of claim 13, wherein the one or more computer-executable instructions, when executed by the at least one processor, further cause the electronic device to:

predict the block template region by using the plurality of chroma candidate modes to determine the plurality of template prediction regions, wherein:

the block template region includes a plurality of chroma reconstructed template samples, each of the plurality of template prediction regions includes a plurality of chroma predicted template samples for each of the plurality of chroma candidate modes, and each of the plurality of cost values is determined by comparing the plurality of chroma reconstructed template samples of the block template region against the plurality of chroma predicted template samples for each of the plurality of chroma candidate modes.

* * * * *